United States Patent
Kikukawa et al.

(10) Patent No.: US 9,388,715 B2
(45) Date of Patent: Jul. 12, 2016

(54) ASSEMBLING APPARATUS AND CONTROL METHOD

(71) Applicant: HIRATA CORPORATION, Shinagawa-ku (JP)

(72) Inventors: Takahiro Kikukawa, Shinagawa-ku (JP); Tadashi Kashiyama, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 57 days.

(21) Appl. No.: 14/224,165

(22) Filed: Mar. 25, 2014

(65) Prior Publication Data

US 2014/0290060 A1    Oct. 2, 2014

(30) Foreign Application Priority Data

Mar. 28, 2013    (JP) .................................. 2013-070430

(51) Int. Cl.
   *B23P 19/04*    (2006.01)
   *F01L 3/10*    (2006.01)
   *B23P 21/00*    (2006.01)

(52) U.S. Cl.
   CPC ................. *F01L 3/10* (2013.01); *B23P 19/045* (2013.01); *B23P 21/004* (2013.01); *F01L 2103/01* (2013.01); *Y10T 29/4927* (2015.01); *Y10T 29/5337* (2015.01); *Y10T 29/53435* (2015.01); *Y10T 29/53687* (2015.01)

(58) Field of Classification Search
   CPC ...................... Y10T 29/53687; Y10T 29/4927; Y10T 29/53435; Y10T 29/5337; F01L 3/10; F01L 2103/01; B23P 19/045; B23P 21/004
   See application file for complete search history.

(56) References Cited

U.S. PATENT DOCUMENTS

| | | | |
|---|---|---|---|
| 8,229,586 B2 | 7/2012 | Wallace et al. | |
| 8,620,467 B2 | 12/2013 | Wallace et al. | |
| 2003/0200641 A1 | 10/2003 | Tachibana et al. | |

FOREIGN PATENT DOCUMENTS

| | | |
|---|---|---|
| CN | 102730099 A | 10/2012 |
| CN | 102756273 A | 10/2012 |
| EP | 1880795 A1 | 1/2008 |
| JP | 2003-311557 A | 11/2003 |
| JP | 2004-345063 A | 12/2004 |
| JP | 2009-142975 A | 7/2009 |

OTHER PUBLICATIONS

Matsumoto et al., U.S. Appl. No. 14/321,063, entitled "Operation Apparatus and Control Method" filed Jul. 1, 2014.
Chinese Office Action dated Dec. 30, 2015 issued in the corresponding Chinese Patent Application No. 201410120869.X (5 pages).

*Primary Examiner* — Sarang Afzali
*Assistant Examiner* — Ruth G Hidalgo-Hernande
(74) *Attorney, Agent, or Firm* — Buchanan Ingersoll & Rooney PC

(57) ABSTRACT

An assembling apparatus of this invention includes a main pallet and a sub pallet detachable from the main pallet, and can convey a cylinder head and parts thereof. The apparatus includes a mechanism disconnecting, from the main pallet, the cylinder head placed on the main pallet and lifting/lowering the cylinder head, a mechanism detaching the sub pallet from the main pallet and lifting/lowering the sub pallet, a mechanism holding the cylinder head lifted to a work operation region, an operation unit extracting a valve retainer from the sub pallet lifted to a part preparation region and assemble it to a cylinder head, and a device arranged between the work operation region and the part preparation region and detaching a pair of cotter pieces.

5 Claims, 23 Drawing Sheets

F I G. 4
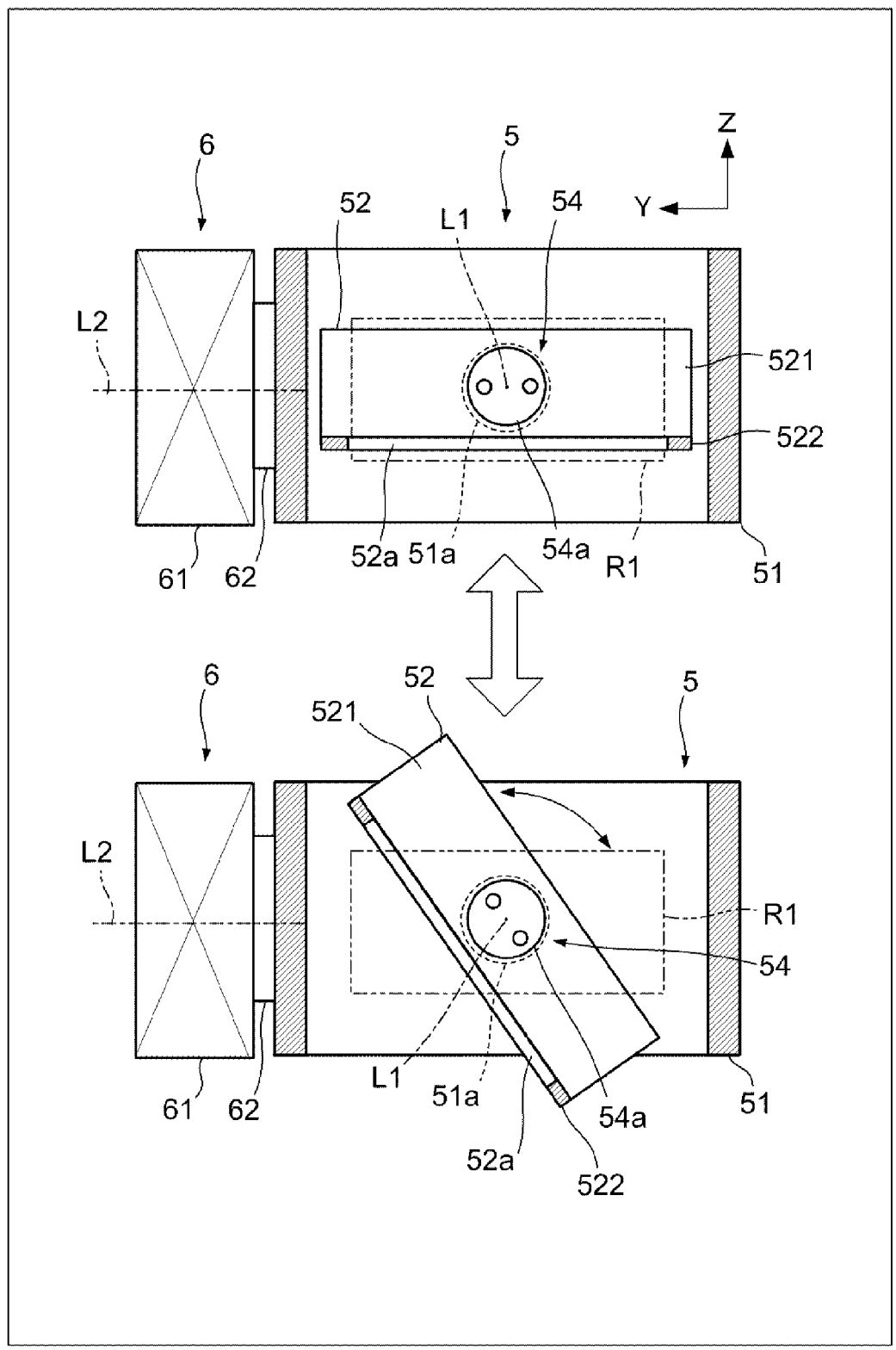

ASSEMBLING APPARATUS AND CONTROL METHOD

BACKGROUND OF THE INVENTION

1. Field of the Invention

The present invention relates to an assembling apparatus for assembling a valve retainer to the cylinder head of an engine.

2. Description of the Related Art

A cell production system is known as a system form in production facilities. In the cell production system, a plurality of assembling operations are performed in one cell. It is therefore necessary to supply a work and parts to be assembled to the work to one cell simultaneously. Japanese Patent Laid-Open No. 2009-142975 discloses a system that simultaneously supplies a work and parts to one cell (station). Japanese Patent Laid-Open No. 2009-142975 also discloses a rotation mechanism that rolls a work in a cell.

When a work rotation mechanism is provided, parts can be assembled to different surfaces of a work. For example, parts to be assembled to the cylinder head of an engine include parts to be attached from the combustion chamber side and parts to be attached from an opposite side. Hence, when the cylinder head can rotate, various kinds of parts can be assembled in the same cell. In the arrangement of Japanese Patent Laid-Open No. 2009-142975, however, an operated work needs to be returned to the same conveyance line as the conveyance line that has conveyed the work to the cell. The work cannot be conveyed through the cell. That is, since the next work cannot be loaded into the cell without returning the operated work to the conveyance line, the production efficiency may lower. In addition, especially for a valve retainer out of the parts to be assembled to the cylinder head, a series of operations including, for example, detaching cotter pieces in advance need to be efficiently done.

SUMMARY OF THE INVENTION

It is an object of the present invention to enable work conveyance through a cell while implementing a function of simultaneously supplying a cylinder head and parts thereof and a function of rolling the cylinder head and also raise the efficiency of valve retainer assembling operation.

According to an aspect of the present invention, there is provided an assembling apparatus for assembling a valve retainer including a pair of cotter pieces to a cylinder head, comprising: a main pallet on which the cylinder head is placed; a sub pallet which is detachably attached to the main pallet and on which at least the valve retainer is placed; a conveyance mechanism configured to horizontally convey the main pallet; a lifting mechanism provided under a predetermined position of a conveyance track of the main pallet by the conveyance mechanism and configured to disconnect, from the main pallet, the cylinder head placed on the main pallet and lift/lower the cylinder head; a moving mechanism provided on one side of the lifting mechanism and configured to detach, from the main pallet, the sub pallet attached to the main pallet and lift/lower the sub pallet; a rotation mechanism configured to hold the cylinder head lifted to a work operation region by the lifting mechanism and roll the cylinder head about a horizontal axis; an operation unit including a retainer holding tool configured to hold the valve retainer, and configured to extract, by the retainer holding tool, the valve retainer from the sub pallet lifted to a part preparation region by the moving mechanism and assemble the valve retainer to a valve stem of a valve incorporated in the cylinder head; and a detaching device arranged between the work operation region and the part preparation region and configured to detach the pair of cotter pieces of the valve retainer in the retainer holding tool such that the valve stem can be inserted and cause the retainer holding tool to hold the pair of cotter pieces.

According to another aspect of the present invention, there is provided a control method of an assembling apparatus for assembling a valve retainer including a pair of cotter pieces to a cylinder head, the assembling apparatus comprising: a main pallet on which the cylinder head is placed; a sub pallet which is detachably attached to the main pallet and on which at least the valve retainer is placed; a conveyance mechanism configured to horizontally convey the main pallet; a lifting mechanism provided under a predetermined position of a conveyance track of the main pallet by the conveyance mechanism and configured to disconnect, from the main pallet, the cylinder head placed on the main pallet and lift/lower the cylinder head; a moving mechanism provided on one side of the lifting mechanism and configured to detach, from the main pallet, the sub pallet attached to the main pallet and lift/lower the sub pallet; a rotation mechanism configured to hold the cylinder head lifted to a work operation region by the lifting mechanism and roll the cylinder head about a horizontal axis; an operation unit including a retainer holding tool configured to hold the valve retainer, and configured to extract, by the retainer holding tool, the valve retainer from the sub pallet lifted to a part preparation region by the moving mechanism and assemble the valve retainer to a valve stem of a valve incorporated in the cylinder head; and a detaching device arranged between the work operation region and the part preparation region and configured to detach the pair of cotter pieces of the valve retainer in the retainer holding tool such that the valve stem can be inserted and cause the retainer holding tool to hold the pair of cotter pieces, the method comprising: a preparation step of moving the cylinder head to the work operation region and the sub pallet to the part preparation region; an extraction step of moving the retainer holding tool to the part preparation region and extracting the valve retainer; a cotter piece detaching step of, after the extraction step, moving the retainer holding tool to the detaching device and detaching the pair of cotter pieces in the retainer holding tool such that the valve stem can be inserted, and causing the retainer holding tool to hold the pair of cotter pieces; and an assembling step of, after the cotter piece detaching step, moving the retainer holding tool to the work operation region and assembling the valve retainer to the valve stem.

Further features of the present invention will become apparent from the following description of exemplary embodiments (with reference to the attached drawings).

BRIEF DESCRIPTION OF THE DRAWINGS

FIG. 4 is an explanatory view of a rotation mechanism and a tilting mechanism;

DESCRIPTION OF THE EMBODIMENTS

<Outline of Apparatus>

Figure 1:
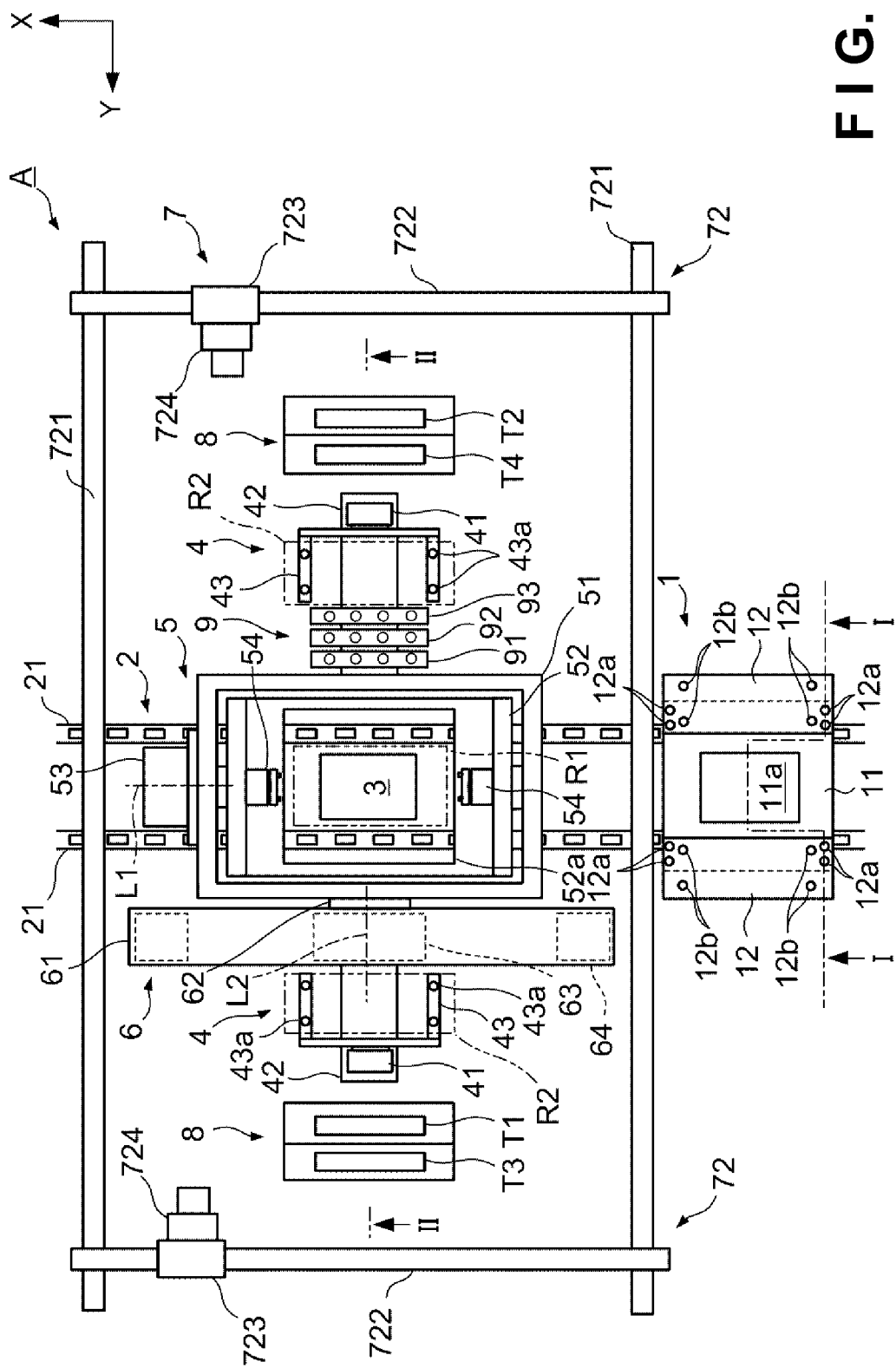
FIG. 1 is a plan view of an assembling apparatus according to an embodiment of the present invention.
Figure 2:
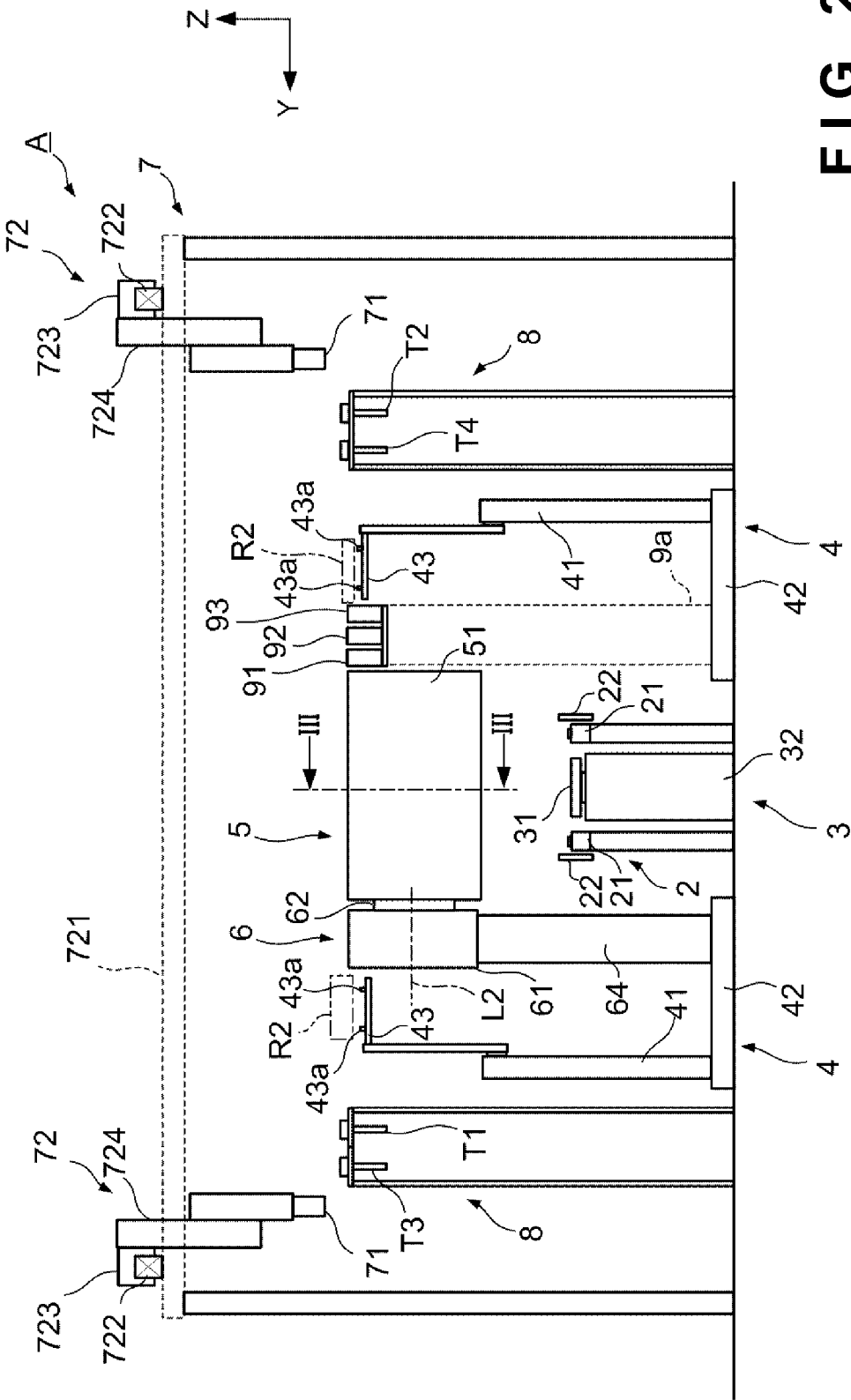
FIG. 2 is a front view of the assembling apparatus shown in FIG. 1.

An assembling apparatus A according to an embodiment of the present invention will be described with reference to FIGS. 1 to 6. Note that arrows X and Y indicate horizontal directions perpendicular to each other, and an arrow Z indicates a vertical direction throughout the drawings. FIG. 1 is a plan view of the assembling apparatus A, and FIG. 2 is a front view of the assembling apparatus A.

The assembling apparatus A includes a pallet 1, a conveyance mechanism 2, a lifting mechanism 3, moving mechanisms 4, a rotation mechanism 5, a tilting mechanism 6, an operation unit 7, tool placement portions 8, and a processing device 9. Note that the X direction is the conveyance direction of the pallet 1 by the conveyance mechanism 2, and the Y direction is a direction perpendicular to the conveyance direction.

<Pallet>

Figure 3:
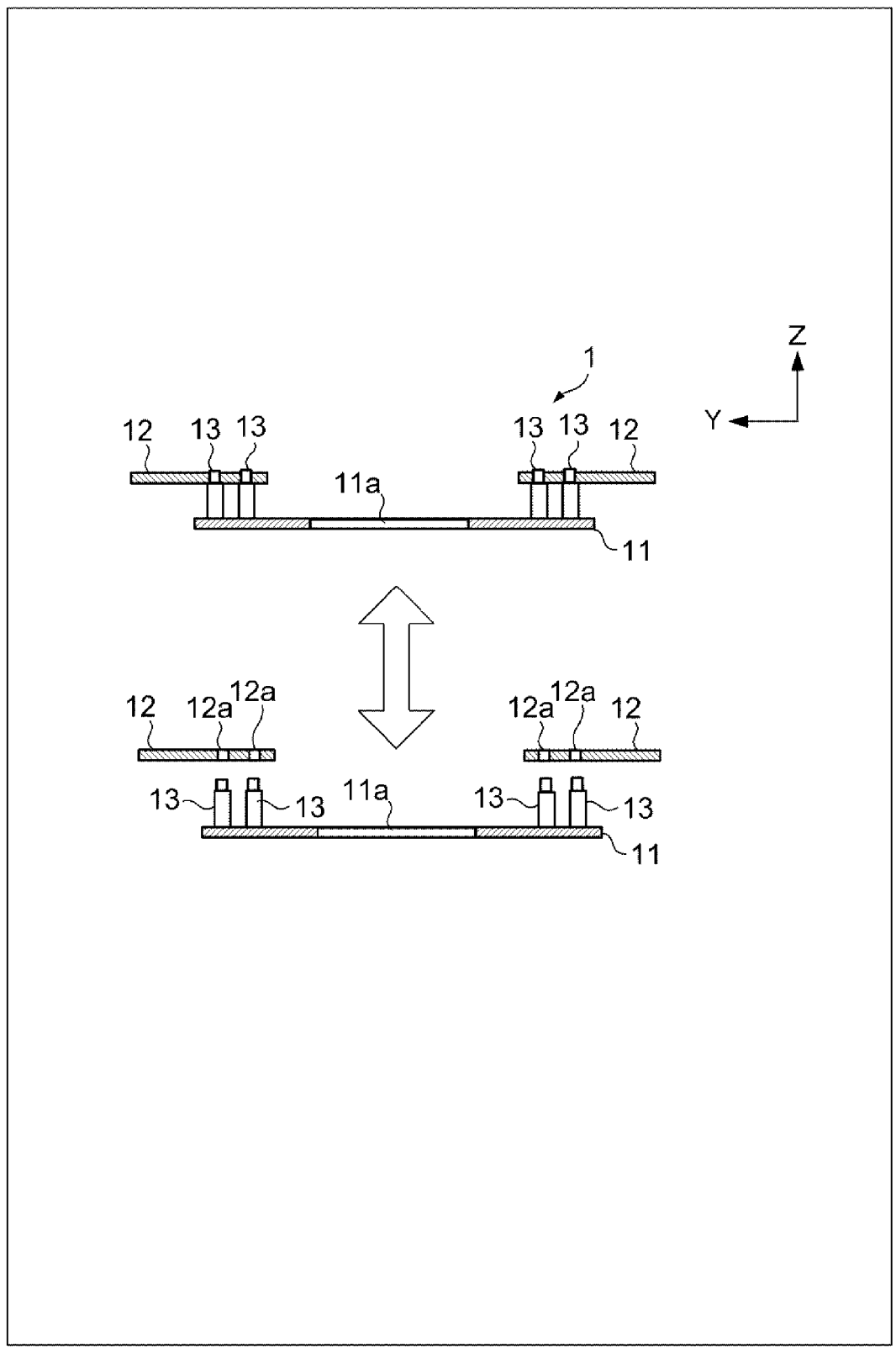
FIG. 3 is an explanatory view of a main pallet and a sub pallet.

The arrangement of the pallet 1 will be described with reference to FIGS. 1 and 3. FIG. 3 is an explanatory view of the pallet 1 which corresponds to a sectional view taken along a line I-I in FIG. 1. The pallet 1 includes a main pallet 11 and a plurality of sub pallets 12. In this embodiment, two sub pallets 12 are used. However, one sub pallet or three or more sub pallets may be used.

A work is placed on the main pallet 11. The main pallet 11 is a plate-shaped member, and has, at its center, an opening 11a extending through the main pallet 11. The opening 11a has a size capable of passing a lifting portion 31 of the lifting mechanism 3 (to be described later).

Parts to be assembled to the work placed on the main pallet 11 are placed on the sub pallets 12. The sub pallets 12 are plate-shaped members.

The sub pallets 12 are detachably attached to both Y-direction side portions of the main pallet 11. An engaging structure using a plurality of pins 13 is used as the detachment/attachment structure of the sub pallets 12 to the main pallet 11. Note that the detachment/attachment structure is not limited to this, and various structures can be employed. The plurality of pins 13 (a total of eight pins including two at each of leading and trailing ends on one side) stand on the main pallet 11. The pin 13 has a small diameter portion at the distal end through a step portion. The diameter of the distal end is smaller than that of the proximal end. Each sub pallet 12 has through holes 12a (a total of four through holes including two at each of leading and trailing ends on the side of the main pallet 11) that receive the distal ends of the pins 13.

When the pins 13 are inserted into the through holes 12a, the sub pallets 12 are attached to the main pallet 11, and they are positioned with respect to each other. The sub pallets 12 can be detached from the main pallet 11 by removing the pins 13 from the through holes 12a. Hence, when the sub pallets 12 are moved in the Z direction, they can be attached/detached to/from the main pallet 11. When the sub pallets 12 are set on the step portions of the pins 13, the horizontal posture of the sub pallets 12 at the time of sub pallets attachment can stably be maintained.

Note that each sub pallet 12 also has through holes 12b (a total of four through holes including two at each of leading and trailing ends) that engage with the moving mechanism 4 (to be described later).

<Conveyance Mechanism and Lifting Mechanism>

The arrangement of the conveyance mechanism 2 will be described with reference to FIGS. 1 and 2. The conveyance mechanism 2 includes a pair of roller conveyors 21. The roller conveyors 21 extend in the X direction. The pair of roller conveyors 21 are parallelly arranged while being spaced apart in the Y direction so that the main pallet 11 can be placed across them. The main pallet 11 is horizontally conveyed by the conveyance mechanism 2. Note that when the main pallet 11 is conveyed by the conveyance mechanism 2, the sub pallets 12 are basically attached to the main pallet 11 and conveyed together with the main pallet 11.

Note that as the conveyance mechanism 2, not only the roller conveyors but also various kinds of conveyance mechanisms including another conveyor such as a belt conveyor can be employed.

The conveyance mechanism 2 includes stoppers 22. The stoppers 22 include a mechanism capable of making them freely appear on the conveyance track of the main pallet 11. When the stoppers 22 appear, they abut against the leading edge of the main pallet 11 in the conveyance direction and stop the main pallet 11 at a predetermined position (to be also referred to as a stop position). In this embodiment, the stop position is set under a work operation region R1. The work operation region R1 is an operation space where parts are assembled.

Note that control of the stop position of the main pallet 11 can be done not only by a mechanical stop using the stoppers 22 but also by driving control of the roller conveyors 21.

The lifting mechanism 3 will be described next with reference to FIG. 2. The lifting mechanism 3 is arranged between the pair of roller conveyors 21. The lifting mechanism 3 is provided under the stop position of the main pallet 11 by the stoppers 22 (that is, under the work operation region R1 in this embodiment). The lifting mechanism 3 includes the lifting portion 31 and a driving portion 32.

The lifting portion 31 has a plate shape and is lifted/lowered in the Z direction by the driving portion 32. The lifting portion 31 is so small as to pass through the opening 11a of the main pallet 11. The driving portion 32 is formed from an electric cylinder. Any arrangement can be employed. For example, an air cylinder, a belt driving mechanism, a ball screw mechanism, a rack and pinion mechanism, or the like using a motor as a driving source can be used.

The lifting portion 31 of the lifting mechanism 3 is normally located at a descent position below the conveyance height of the conveyance mechanism 2. FIG. 2 shows a state in which the lifting portion 31 is located at the descent position. When the main pallet 11 stops at the stop position, the driving portion 32 is driven to lift the lifting portion 31 and locate it at an ascent position. In the process of rising, the lifting portion 31 passes through the opening 11a of the main pallet 11 and raises a work placed on the main pallet 11. The work is thus disconnected from the main pallet 11.

When the lifting portion 31 reaches the ascent position, the work is located in the work operation region R1. When the rotation mechanism 5 (to be described later) holds the work, the work is transferred from the lifting mechanism 3 to the rotation mechanism 5. After that, the lifting portion 31 lowers. When an operation for the work ends, the lifting portion 31 rises again, and the work is transferred from the rotation mechanism 5 to the lifting mechanism 3. After that, the work is lowered by the lifting portion 31 and placed on the main pallet 11 again.

<Moving Mechanism>

The arrangement of the moving mechanism 4 will be described next with reference to FIGS. 1 an 2. The moving mechanism 4 moves the sub pallets 12. In this embodiment, two sub pallets 12 are provided in correspondence with one pallet 1. Hence, two moving mechanisms 4 are provided. The two moving mechanisms 4 are arranged on both sides of the lifting mechanism 3 in the Y direction. When one sub pallet 12 is provided in correspondence with one pallet 1, one moving mechanism 4 is provided and arranged on one side of the lifting mechanism 3 (the side on which the sub pallet 12 is arranged).

The moving mechanisms 4 detach the sub pallets 12 from the main pallet 11 at a position (to be also referred to as a sub stop position) where the sub pallets 12 are attached to the main pallet 11 at the stop position, and also move the sub pallets 12 to part preparation regions R2. The part preparation regions R2 are spaces where parts to be assembled to the work are arranged. In this embodiment, the moving mechanisms 4 move the sub pallets 12 in the Z direction and the Y direction, thereby moving the sub pallets 12 between the sub stop position and the part preparation regions R2.

Each moving mechanism 4 includes a moving portion 41, a moving portion 42, and a hand portion 43. The moving portion 41 moves the hand portion 43 in the Z direction. The hand portion 43 is a plate-shaped member, and the sub pallet 12 is placed on its upper surface. A plurality of pins 43a (a total of four pins) stand on the upper surface of the hand portion 43. When the subpallet 12 is placed on the hand portion 43, in other words, when the sub pallet 12 is caught by the hand portion 43, the pins 43a are inserted into the through holes 12b of the sub pallet 12. The sub pallet 12 and the hand portion 43 thus engage with each other and are positioned with respect to each other. Note that the engaging/positioning structure between the hand portion 43 and the sub pallet 12 can be any structure other than the pins 43a and the through holes 12b.

The moving portion 42 moves the moving portion 41 horizontally in the Y direction. The sub pallet 12 can be moved in the Z direction and the Y direction by the Z-direction movement of the hand portion 43 by the moving portion 41 and the Y-direction movement of the moving portion 41 by the moving portion 42. As the driving mechanism of each of the moving portion 41 and the moving portion 42, for example, a belt driving mechanism, a ball screw mechanism, a rack and pinion mechanism, or the like using a motor as a driving source can be used.

Note that in this embodiment, the hand portion 43 is moved in the Z direction. However, a Y-direction moving portion configured to move the hand portion 43 in the Y direction and a Z-direction moving portion configured to move the Y-direction moving portion in the Z direction may be formed. That is, the combination of the moving portions 41 and 42 is inverted so that the Z-direction moving portion can lift/lower both the hand portion 43 and the Y-direction moving portion. Additionally, in this embodiment, the moving mechanism 4 moves the sub pallet 12 in both the Z direction and the Y direction. However, the sub pallet 12 may be moved only in the Z direction or only in the Y direction depending on the arrangement of the assembling apparatus A or the positions of the part preparation regions R2.

<Rotation Mechanism and Tilting Mechanism>

Figure 5:
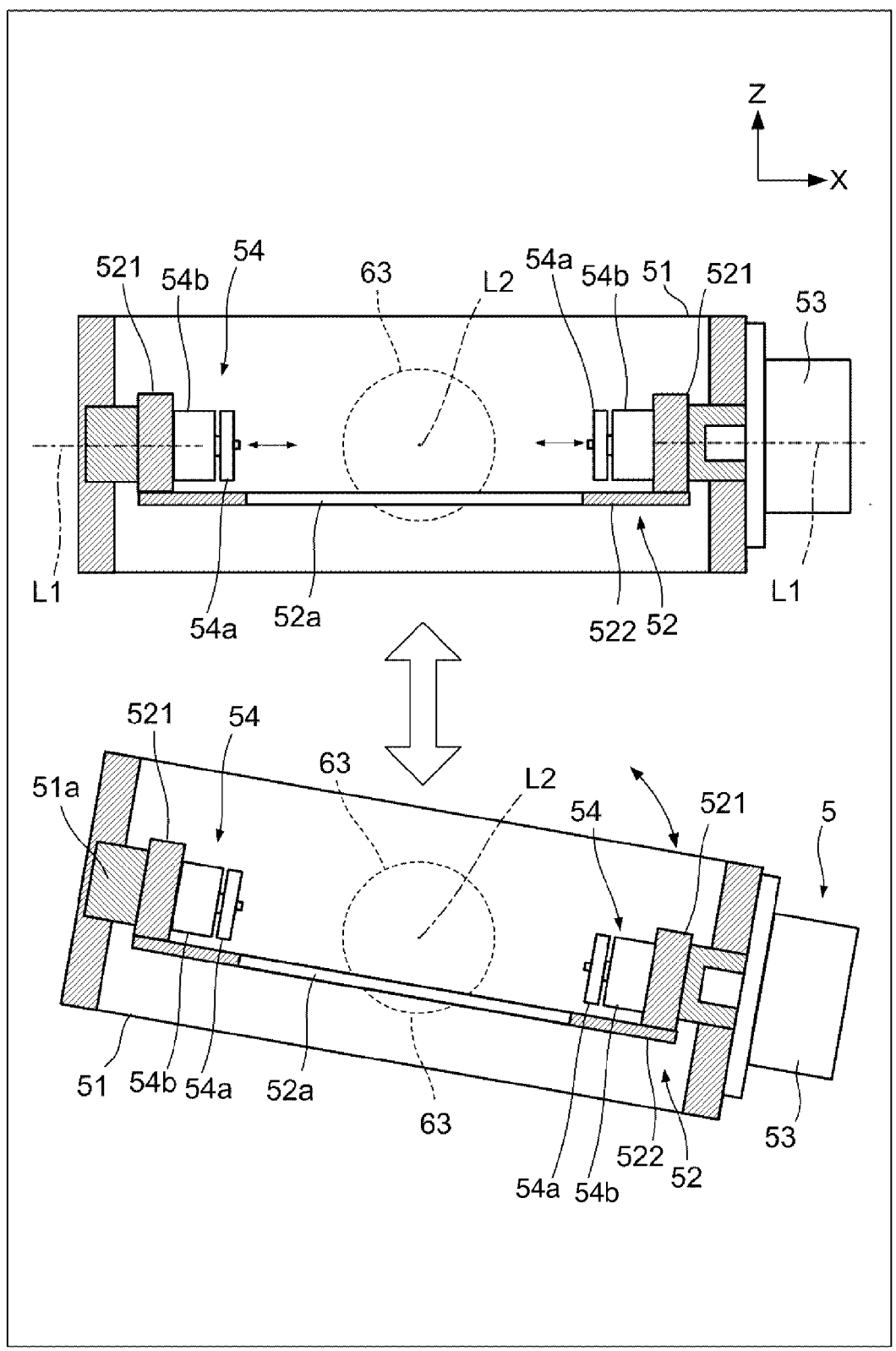
FIG. 5 is an explanatory view of the rotation mechanism and the tilting mechanism.

The rotation mechanism 5 and the tilting mechanism 6 will be described next with reference to FIGS. 1, 2, 4, and 5. FIGS. 4 and 5 are explanatory views of the rotation mechanism 5 and the tilting mechanism 6, respectively. FIG. 4 corresponds to a sectional view taken along a line II-II in FIG. 1, and FIG. 5 corresponds to a sectional view taken along a line III-III in FIG. 2. The rotation mechanism 5 is a mechanism configured to hold a work lifted to the work operation region R1 and roll it about an axis L1. The tilting mechanism 6 is a mechanism configured to make the rotation mechanism 5 pivot with respect to a horizontal axis L2 in the Y direction as a pivotal center. The tilting mechanism 6 can pitch the work held by the rotation mechanism 5 about the horizontal axis L2. The axis L1 is a horizontal axis in a direction perpendicular to the horizontal axis L2 or a horizontal axis in the X direction when the rotation mechanism 5 is postured horizontally. Details will be described below.

The rotation mechanism 5 includes a base portion 51, a rotation portion 52, a driving portion 53, and holding portions 54. The base portion 51 is a rectangular tube-like member opening in the Z direction and is supported by the tilting mechanism 6 in a cantilevered state. The rotation portion 52 is arranged inside the base portion 51 and rotatably supported by the X-direction side walls of the base portion 51 through an axial member 51a that defines the axis L1.

The rotation portion 52 includes a pair of wall portions 521 facing each other, and a connection portion 522 configured to connect the wall portions 521 with each other. The holding mechanisms 54 configured to hold a work are provided on the wall portions 521. The connection portion 522 has an opening 52a capable of passing the work.

Each holding mechanism 54 includes an engaging portion 54a and an actuator 54b. The engaging portion 54a engages with the work. The actuator 54b moves the engaging portion 54a in the direction of arrows of the upper illustration of FIG. 5 (the opposing direction of the wall portions 521 or the leftward/rightward direction in FIG. 5). The actuator 54b is, for example, a ball screw mechanism, an electric cylinder, or an air cylinder. The work is introduced into the rotation portion 52 through the opening 52a and held while being sandwiched by the engaging portions 54a of the pair of holding mechanisms 54.

The driving portion 53 is, for example, a motor and is fixed to the base portion 51. The drive shaft of the driving portion 53 is connected to the axial member 51a and rotates the axial member 51a. The rotation portion 52 can thus be rotated, and therefore, the work held by the pair of holding mechanisms 54 can be rotated.

The tilting mechanism 6 includes a main body portion 61, an axial member 62, a driving portion 63, and leg portions 64. The main body portion 61 is supported by the pair of leg portions 64 at its both ends and the tilting mechanism 6 has a gate shape (inverted U shape) as a whole. The axial member 62 is supported at the center of the main body portion 61. The axial member 62 defines the horizontal axis L2, and is rotated by the driving portion 63 incorporated in the main body portion 61. The driving portion 63 is, for example, a motor. The rotation mechanism 5 has the base portion 51 supported by the axial member 62 and is made to pivot as a whole by the tilting mechanism 6. The work held by the rotation mechanism 5 can thus be pitched about the horizontal axis L2.

<Operation Unit, Tool Placement Portion, and Processing Device>

The operation unit 7, the tool placement portions 8, and the processing device 9 will be described next with reference to FIGS. 1 and 2.

The operation unit 7 includes a mechanism configured to extract parts from the sub pallets 12 lifted to the part preparation regions R2 and assemble the extracted parts to the work located in the work operation region R1. In this embodiment, the operation unit 7 includes two sets of head portions 71 and moving devices 72. One of tools T1 to T4 (to be generically referred to as tools T) is interchangeably attached to each head portion 71. A plurality of tools T (in this embodiment, four different tools) are prepared in accordance with the types of parts and placed on the tool placement portions 8. In this embodiment, the tool T can simultaneously handle four identical parts and simultaneously assemble them to a work.

Two sets of tool placement portions 8 are prepared in correspondence with the number of head portions 71. The tools T1 and T3 are placed on one tool placement portion 8, and the tools T2 and T4 are placed on the other tool placement portion 8. The tool placement portion 8 has a frame shape, and each tool T is placed on the corresponding tool placement portion 8 with the attachment portion to the head portion 71 facing up. The head portion 71 can be moved close to the tool T from above and attach the tool T. The head portion 71 need not always be moved close to the tool T from above. For example, a detachment/attachment portion may be provided on a side surface of the tool T, and the head portion 71 may be moved close to the tool T from side.

The moving device 72 constitutes a gantry type transfer mechanism, and moves the head portions 71 in the X, Y, and Z directions. The moving device 72 includes movable rails 722 that move on a pair of fixed rails 721. The pair of fixed rails 721 extend in the Y direction to be parallel to each other. The movable rails 722 extend in the X direction and are installed across the pair of fixed rails 721. The movable rails 722 reciprocally move in the Y direction while being guided by the pair of fixed rails 721.

A slider 723 reciprocally moves on the movable rail 722 in the X direction. A lifting mechanism 724 is fixed to the slider 723 and lifts/lowers the head portion 71 in the Z direction. As the driving mechanism of each of the movable rails 722, the sliders 723, and the lifting mechanisms 724, for example, a belt driving mechanism, a ball screw mechanism, a rack and pinion mechanism, or the like using a motor as a driving source can be used.

The processing device 9 is arranged between the work operation region R1 and the part preparation region R2. The processing device 9 performs predetermined processes for parts extracted from the sub pallets 12 before they are attached to the work. In this embodiment, the processing device 9 is provided with three types of devices 91 to 93. Detailed examples will be described later.

In this embodiment, the part preparation region R2 is spaced apart from the work operation region R1 in the Y direction, and the processing device 9 is arranged between them. Hence, parts extracted from the part preparation region R2 by the operation unit 7 can undergo the processes of the processing device 9 halfway through the movement to the work operation region R1. This shortens the moving distance of the head portion 71 and implements an efficient operation.

In this embodiment, the work operation region R1, the processing device 9, the part preparation region R2, and the tool placement portion 8 are arranged in this order along the Y direction. Hence, when attaching the tool T, extracting a part, processing the part by the processing device 9, and assembling the part to the work, the head portion 71 is moved in one direction, and an efficient operation is implemented.

Note that in this embodiment, the processing device 9 is arranged only on one side in the Y direction when viewed from the work operation region R1. However, an arrangement including the processing devices 9 arranged on both sides can also be employed.

<Control Device>

Figure 6:
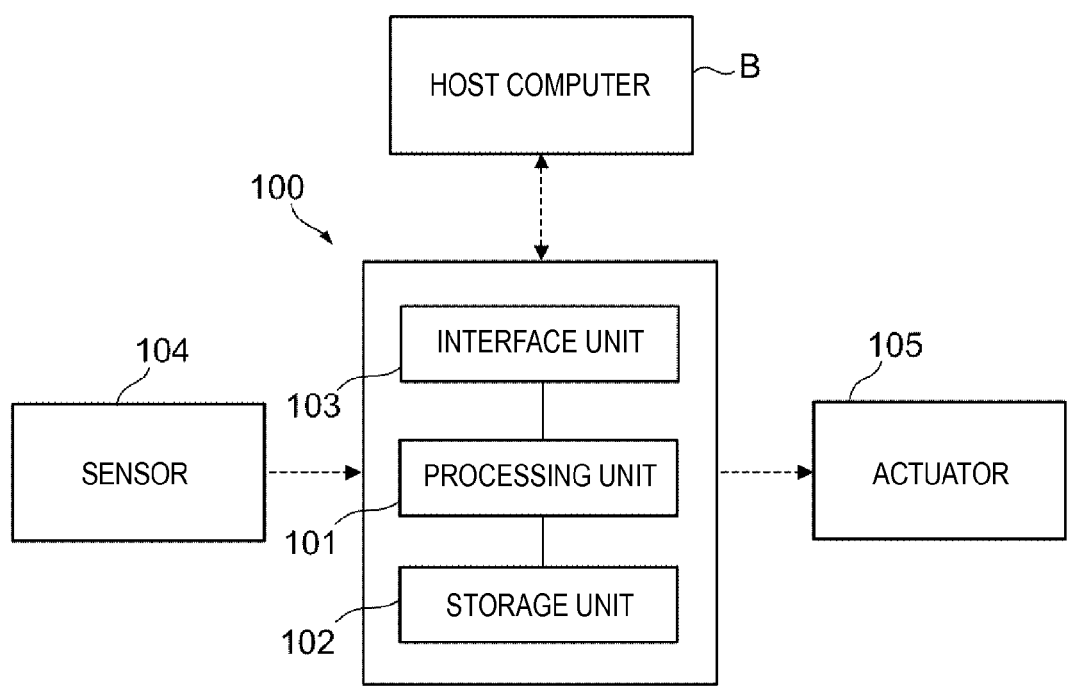
FIG. 6 is a block diagram of a control device.

The arrangement of a control device 100 of the assembling apparatus A will be described next with reference to FIG. 6. FIG. 6 is a block diagram of the control device 100. The control device 100 includes a processing unit 101, a storage unit 102, and an interface unit 103, which are connected to each other via a bus (not shown). The processing unit 101 executes a program stored in the storage unit 102. The processing unit 101 is, for example, a CPU. The storage unit 102 is, for example, a RAM, a ROM, a hard disk, or the like. The interface unit 103 is provided between the processing unit 101 and external devices (a host computer B, a sensor 104, and an actuator 105), and formed from, for example, a communication interface or an I/O interface. The host computer B is a control device configured to control the overall production facility including assembling apparatus A.

The sensor 104 and the actuator 105 include sensors, driving sources, and the like necessary for the operations of the conveyance mechanism 2, the lifting mechanism 3, the moving mechanism 4, the rotation mechanism 5, the tilting mechanism 6, the operation unit 7, and the processing device 9. The control device 100 controls the assembling apparatus A based on an instruction from the host computer B. A control example of the assembling apparatus A will be described below.

<Control Example>

Figure 7:
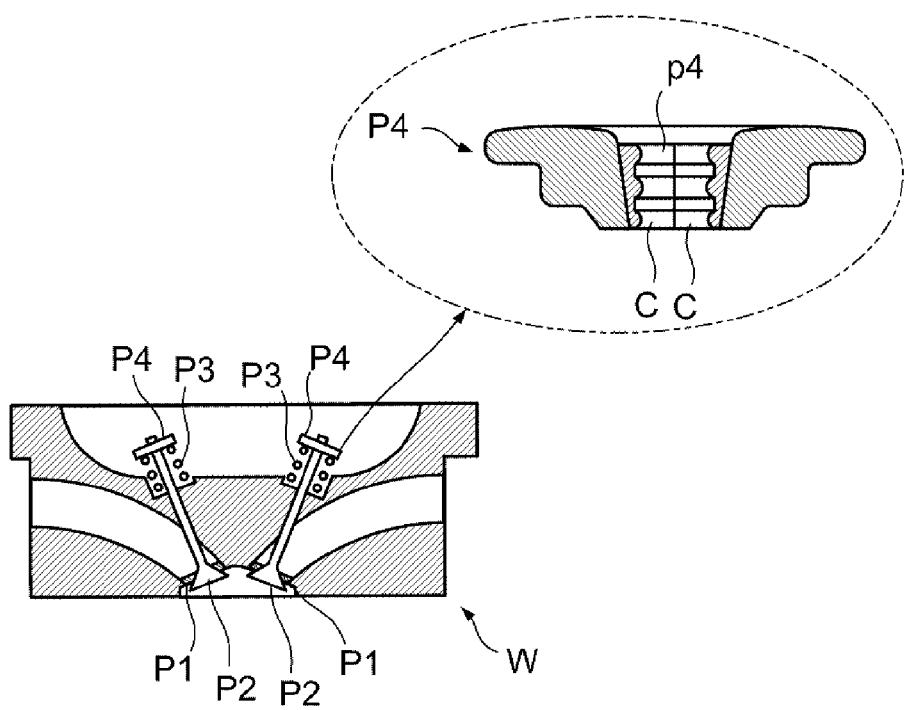
FIG. 7 is an explanatory view of an example of a work and parts.

A case where the assembling apparatus A performs an operation of assembling an intake valve and an exhaust valve to the cylinder head of an engine will be explained here. FIG. 7 is an explanatory view of this. A work W is a cylinder head and will also be referred to as a cylinder head W hereinafter. Parts P1 to P4 to be assembled are a valve seat, a valve, a valve spring, and a valve retainer, respectively, and will also be referred to as a seat P1, a valve P2, a spring P3, and a retainer P4 hereinafter.

The retainer P4 includes a cotter p4, and is attached to the stem of the valve P2 through the cotter p4. The retainer P4 has a cylindrical shape with a through hole for receiving the cotter p4, and has, at its upper portion, a flange portion against which an end of the spring P3 abuts.

The cotter p4 forms a hole through which the stem of the valve P2 is inserted, and has, on its inner surface, an engaging portion configured to engage with an engaging groove formed in the stem of the valve P2. The cotter p4 has a tapered outer surface conforming to the shape of the inner wall of the through hole of the retainer P4. For this reason, the cotter p4 can be removed to the upper side of the retainer P4 but not to the lower side.

The cotter p4 is formed from a pair of cotter pieces C each having a shape corresponding to a half of the cotter. The retainer P4 is attached to the stem of the valve P2 through the cotter p4 as is known in general. More specifically, the cotter p4 is attached to the stem while the cotter pieces C sandwich the engaging groove portion at an end of the stem of the valve P2. Then, the cotter p4 is inserted into the through hole of the retainer P4.

Figure 8:
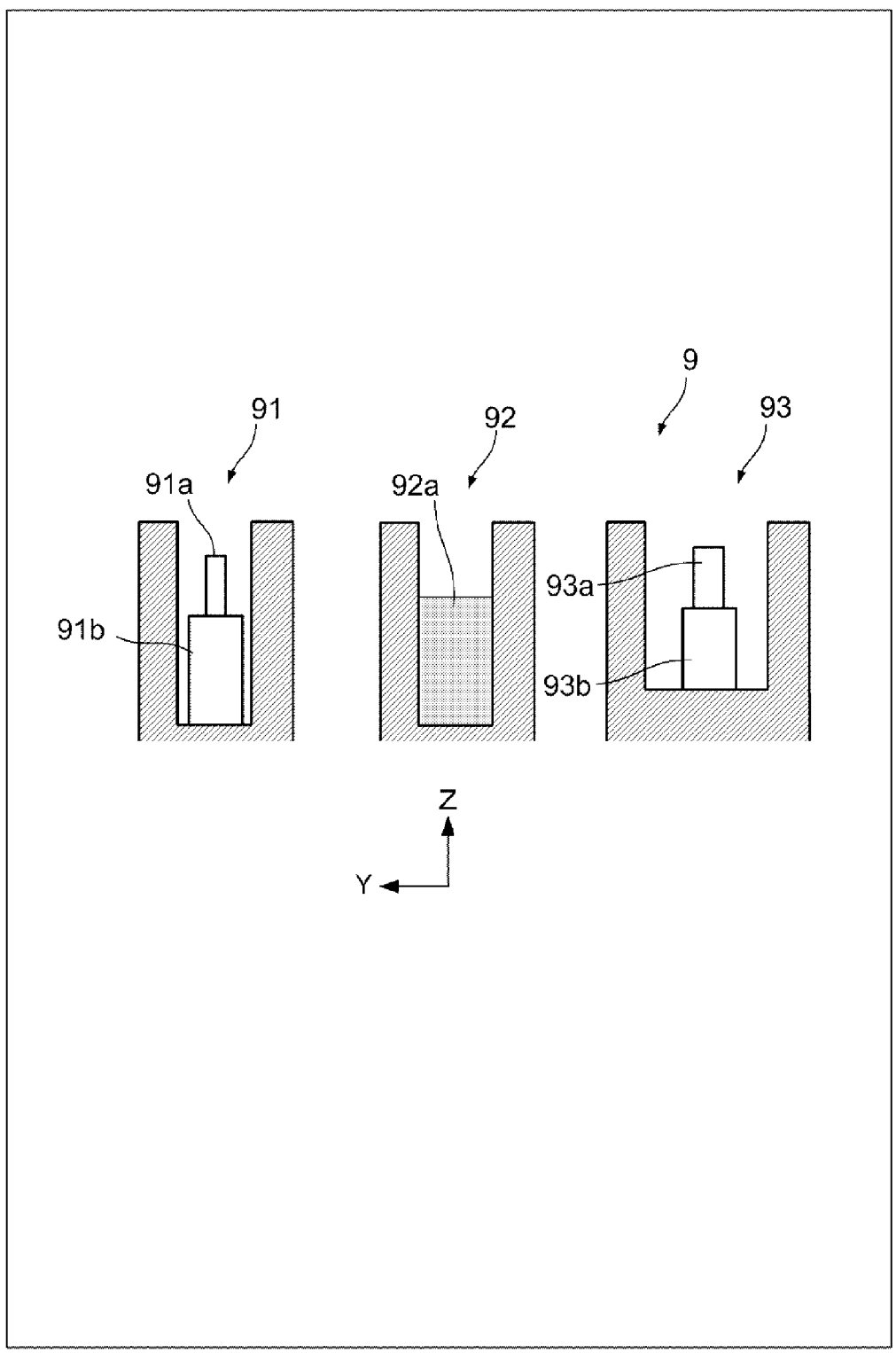
FIG. 8 is an explanatory view of an example of a processing device.

FIG. 8 shows detailed examples of the devices 91 to 93 of the processing device 9. The processing device 9 includes the detaching device 91, the oil feeding device 92, and the inspection device 93. The detaching device 91 pushes the cotter p4 up and detaches the cotter pieces C from the retainer P4. In this embodiment, the detaching device 91 includes a push shaft 91a and an actuator 91b configured to lift/lower the push shaft 91a. The actuator 91b is, for example, an electric cylinder.

The oil feeding device 92 contains lubricating oil 92a. The oil feeding device 92 feeds the lubricating oil 92a to the stem end when assembling the valve P2 to the cylinder head W. The inspection device 93 inspects whether the cotter pieces C remain in the tool T after the assembling operation of the retainer P4. In this embodiment, the inspection device 93 includes a push button switch including a button portion 93a and a sensing portion 93b configured to sense a push on the button portion 93a.

Figure 9:
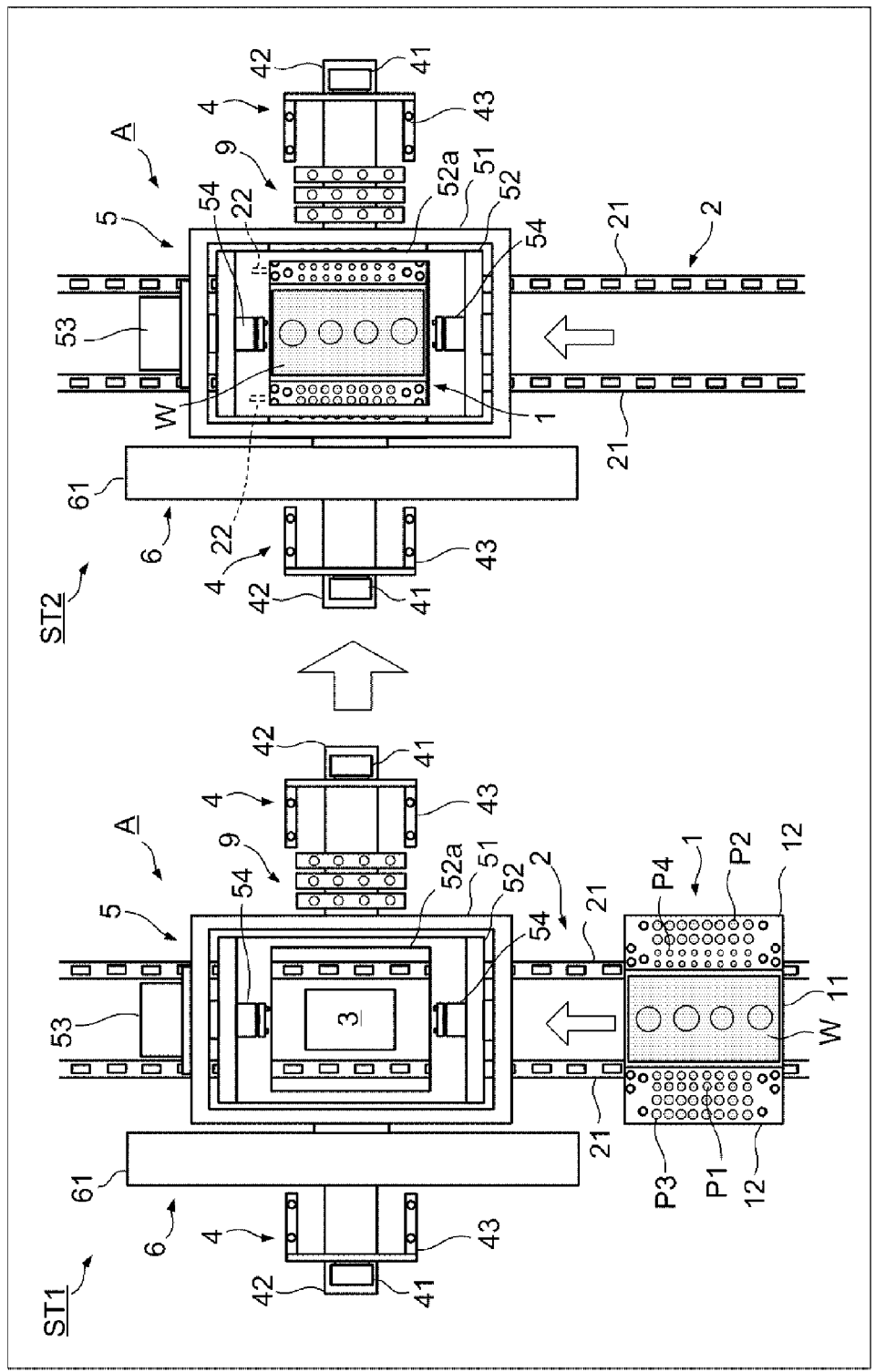
FIG. 9 is an explanatory view of the operation of the assembling apparatus shown in FIG. 1.
Figure 10:
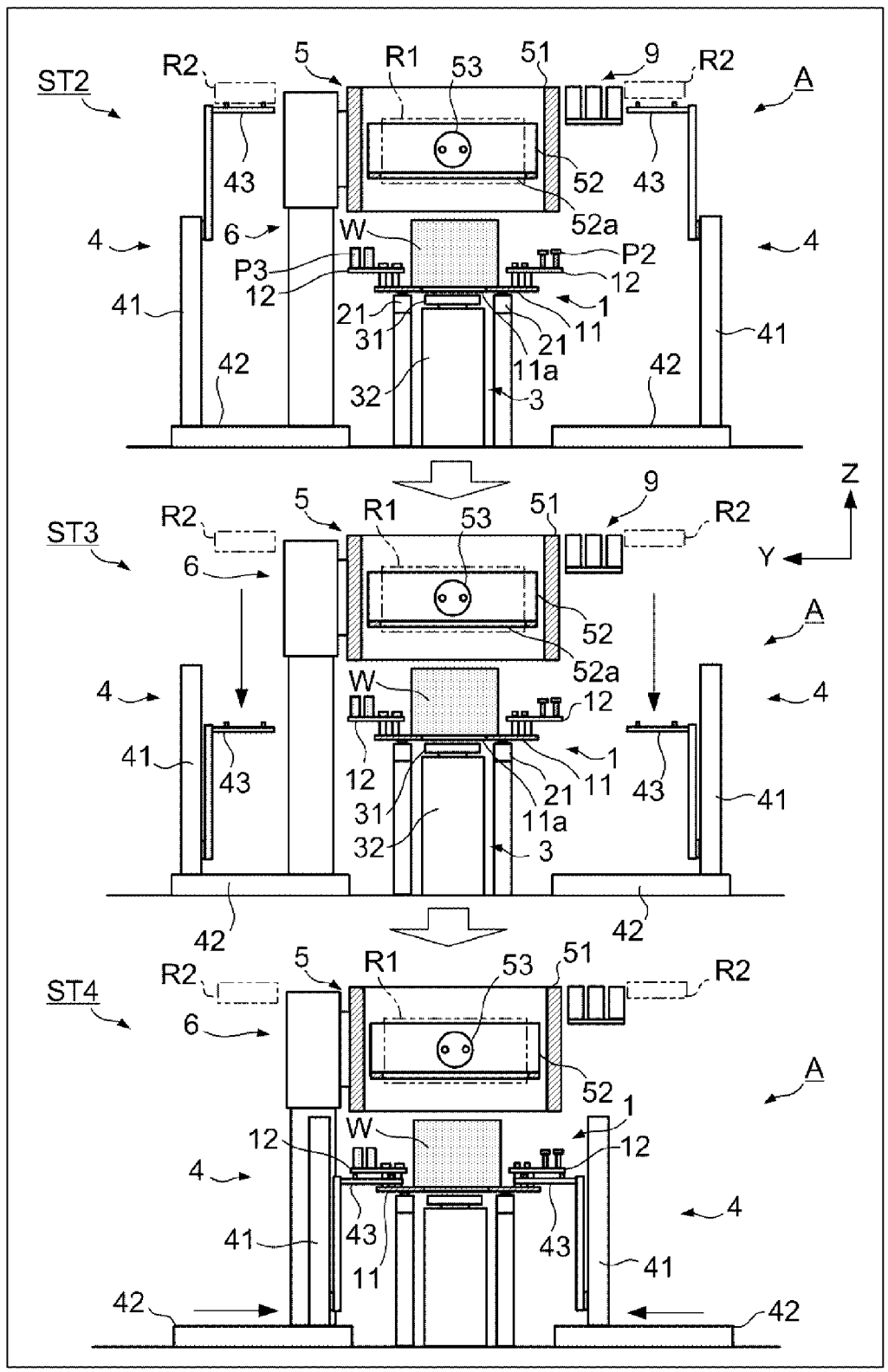
FIG. 10 is an explanatory view of the operation of the assembling apparatus shown in FIG. 1.

An assembling operation of one unit will be described with reference to FIGS. 9 to 15. A state ST1 shown in FIG. 9 represents a state in which the pallet 1 is loaded into the assembling apparatus A. As shown in FIG. 9, the pallet 1 is conveyed by the conveyance mechanism 2 (conveyance step). The cylinder head W is placed on the main pallet 11. The valves P2 and the retainers P4 are placed on the sub pallet 12 on the right side in FIG. 9. The seats P1 and the springs P3 are placed on the sub pallet 12 on the left side in FIG. 9. As indicated by a state ST2 shown in FIGS. 9 and 10, when the main pallet 11 reaches the stop position, conveyance is stopped by the stoppers 22, and the cylinder head W is located under the work operation region R1.

Next, the process shifts to a preparation step of moving the cylinder head W to the work operation region R1 and the sub pallets 12 to the part preparation regions R2, respectively. First, the moving mechanisms 4 start moving the sub pallets 12 to the part preparation regions R2 (a start of a sub pallet detaching/lifting step). As indicated by a state ST3 shown in FIG. 10, the moving portions 41 lower the hand portions 43. The height of the hand portions 43 is set to the height of the gap between the main pallet 11 and the sub pallets 12 in the vertical direction.

Subsequently, the moving portions 42 move the moving portions 41 to the sides of the sub pallets 12. The hand portions 43 are thus located between the main pallet 11 and the sub pallets 12, as indicated by a state ST4 shown in FIG. 10. Next, the moving portions 41 lift the hand portions 43, as indicated by a state ST5 shown in FIG. 11. At this time, the pins 43a of the hand portions 43 are inserted into the through holes 12b of the sub pallets 12 so that the sub pallets 12 and the hand portions 43 engage and are positioned with respect to each other. The hand portions 43 are lifted up to a height where the sub pallets 12 are detached from the main pallet 11.

Figure 11:
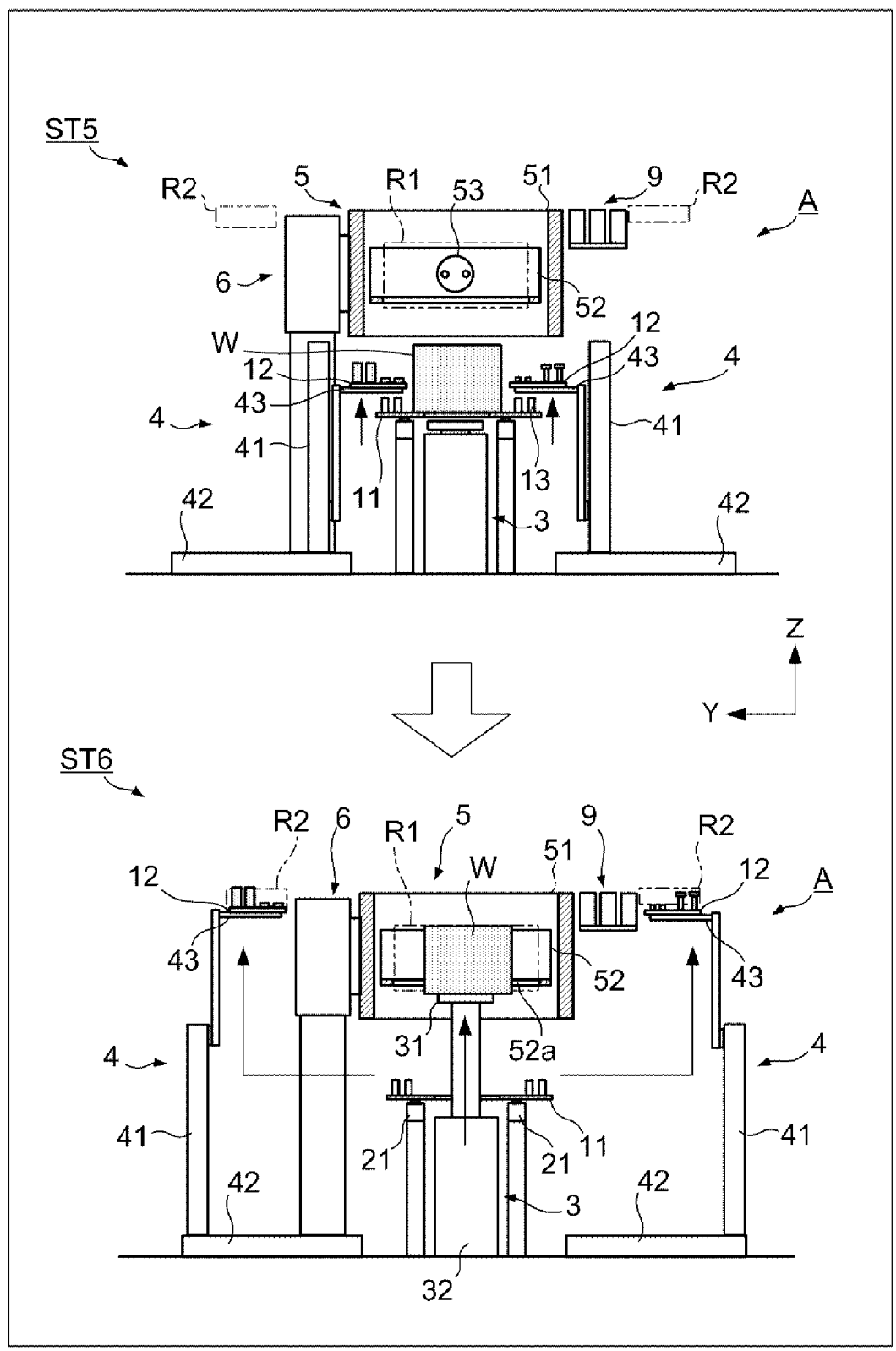
FIG. 11 is an explanatory view of the operation of the assembling apparatus shown in FIG. 1.
Figure 12:
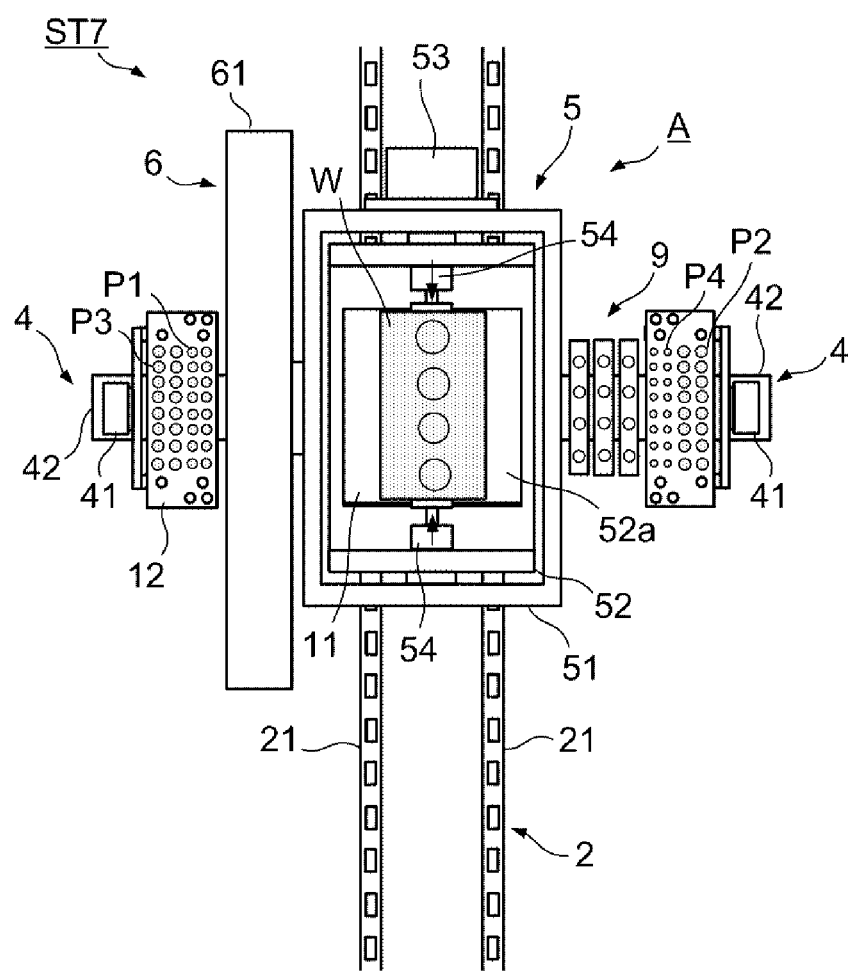
FIG. 12 is an explanatory view of the operation of the assembling apparatus shown in FIG. 1.

Next, as indicated by a state ST6 shown in FIG. 11, the moving portions 42 move the moving portions 41 until the sub pallets 12 are located under the part preparation region R2.

After that, the moving portions 41 lift the hand portions 43, and the sub pallets 12 are arranged in the part preparation regions R2 (completion of the sub pallet detaching/lifting step).

In parallel to this operation, the lifting mechanism 3 moves the cylinder head W to the work operation region R1. More specifically, the driving portion 32 is driven to lift the lifting portion 31, and the lifting portion 31 is located at the ascent position (work lifting step). During the lifting process, the lifting portion 31 passes through the opening 11a of the main pallet 11 and raises the cylinder head W placed on the main pallet 11. The cylinder head W is thus disconnected from the main pallet 11 and located in the work operation region R1.

Next, the rotation mechanism 5 holds the cylinder head W located in the work operation region R1. As indicated by a state ST7 shown in FIG. 12, the pair of holding portions 54 are driven to sandwich the cylinder head W from both sides in the X direction. The cylinder head W is thus held by the rotation mechanism 5. When the rotation mechanism 5 holds the cylinder head W, the driving portion 32 is driven to lower the lifting portion 31 to the descent position. The rotation mechanism 5 thus becomes capable of rotating the cylinder head W without interfering with the lifting mechanism 3.

With the above-described operation, the cylinder head W is located in the work operation region R1, and the parts P1 to P4 are located in the part preparation regions R2. The process shifts to an operation of assembling the parts P1 to P4 to the cylinder head W. The assembling order of the parts P1 to P4 is seat P1→valve P2→spring P3→retainer P4. A state ST11 shown in FIG. 13 represents an assembling operation of the seat P1 and the valve P2 (assembling step).

Figure 13:
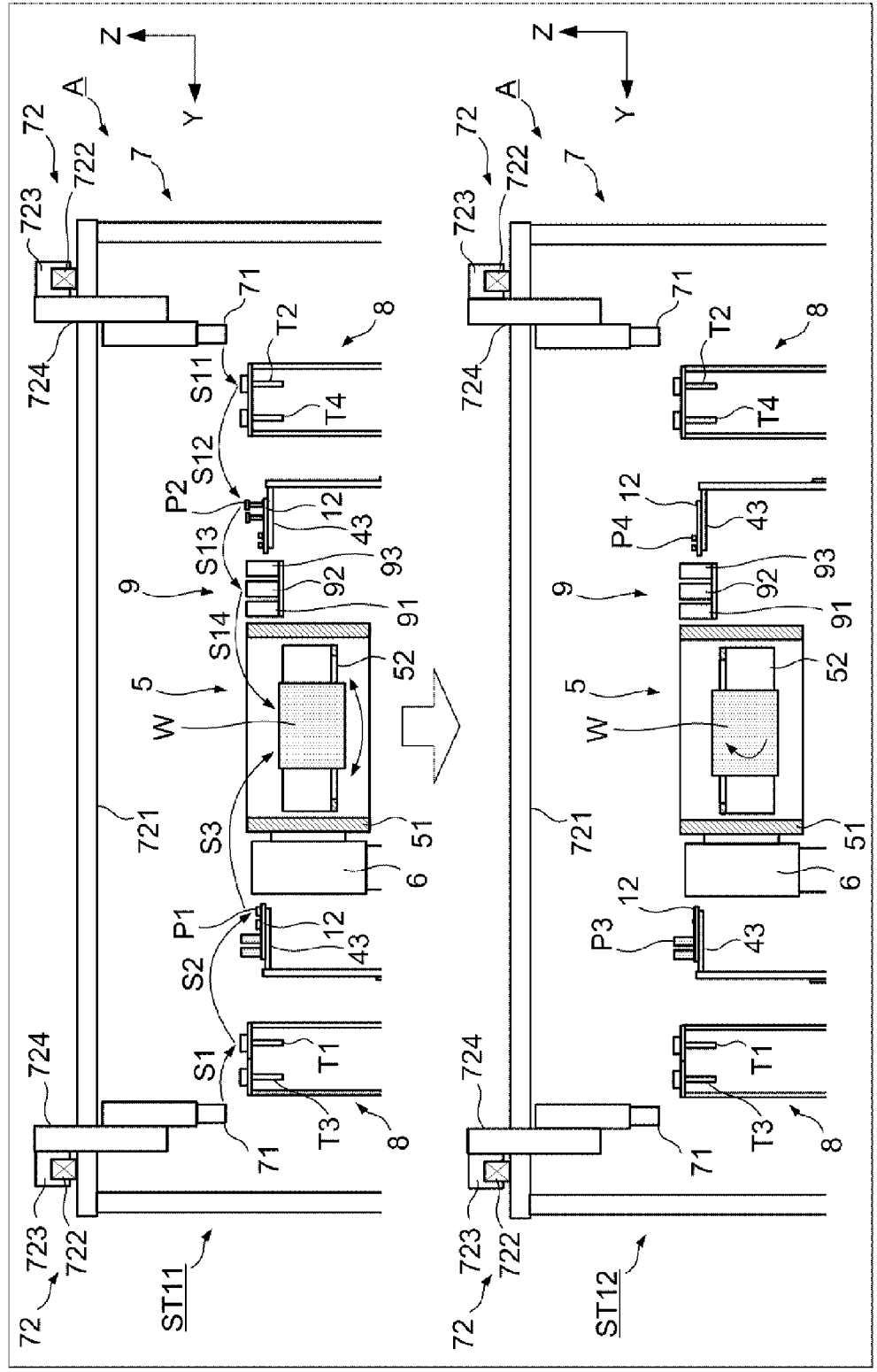
FIG. 13 is an explanatory view of the operation of the assembling apparatus shown in FIG. 1.

Assembling of the seat P1 is done by the head portion 71 and the moving device 72 on the left side of FIG. 13, and assembling of the valve P2 is done by the head portion 71 and the moving device 72 on the right side of FIG. 13. Four seats P1 and four valves P2 are alternately assembled.

The assembling procedure of the seat P1 will be described. First, the tool T1 corresponding to holding the seat P1 is attached to the head portion 71 (S1). Next, the seat P1 in the part preparation region R2 is held by the tool T1 and extracted (S2: extraction step). The held seat P1 is moved horizontally in the Y direction to the work operation region R1 and assembled to the cylinder head W (S3). The operations S2 and S3 are repeated from then on.

The assembling procedure of the valve P2 will be described. First, the tool T2 corresponding to holding the valve P2 is attached to the head portion 71 (S11). Next, the valve P2 in the part preparation region R2 is held by the tool T2 and extracted (S12: extraction step). The held valve P2 is moved horizontally in the Y direction to the oil feeding device 92, and the oil is fed to the distal end of the stem (S13). Finally, the valve P2 is moved horizontally in the Y direction to the work operation region R1 and assembled to the cylinder head W (S14). The operations S12 to S14 are repeated from then on.

The operation unit 7 lifts/lowers the tool T in the Z direction from above the cylinder head W and performs the operation. The rotation mechanism 5 and the tilting mechanism 6 change the posture of the cylinder head W in accordance with the operation so that the operation can appropriately be performed during assembling of the parts P1 to P4. For example, depending on the insertion angle of the valve P2 with respect to the cylinder head W, the posture of the cylinder head W is adjusted by the tilting mechanism 6, or the cylinder head W is rolled by the rotation mechanism 5 (rotation step).

The seat P1 and the valve P2 are assembled from the side of the combustion chamber of the cylinder head W. On the other hand, the spring P3 and the retainer P4 are assembled from an opposite side. Hence, when assembling of the seat P1 and the valve P2 is completed, the rotation mechanism 5 rolls the cylinder head W so that the cylinder head W is inverted (rotation step), as indicated by a state ST12 shown in FIG. 13.

Figure 14:
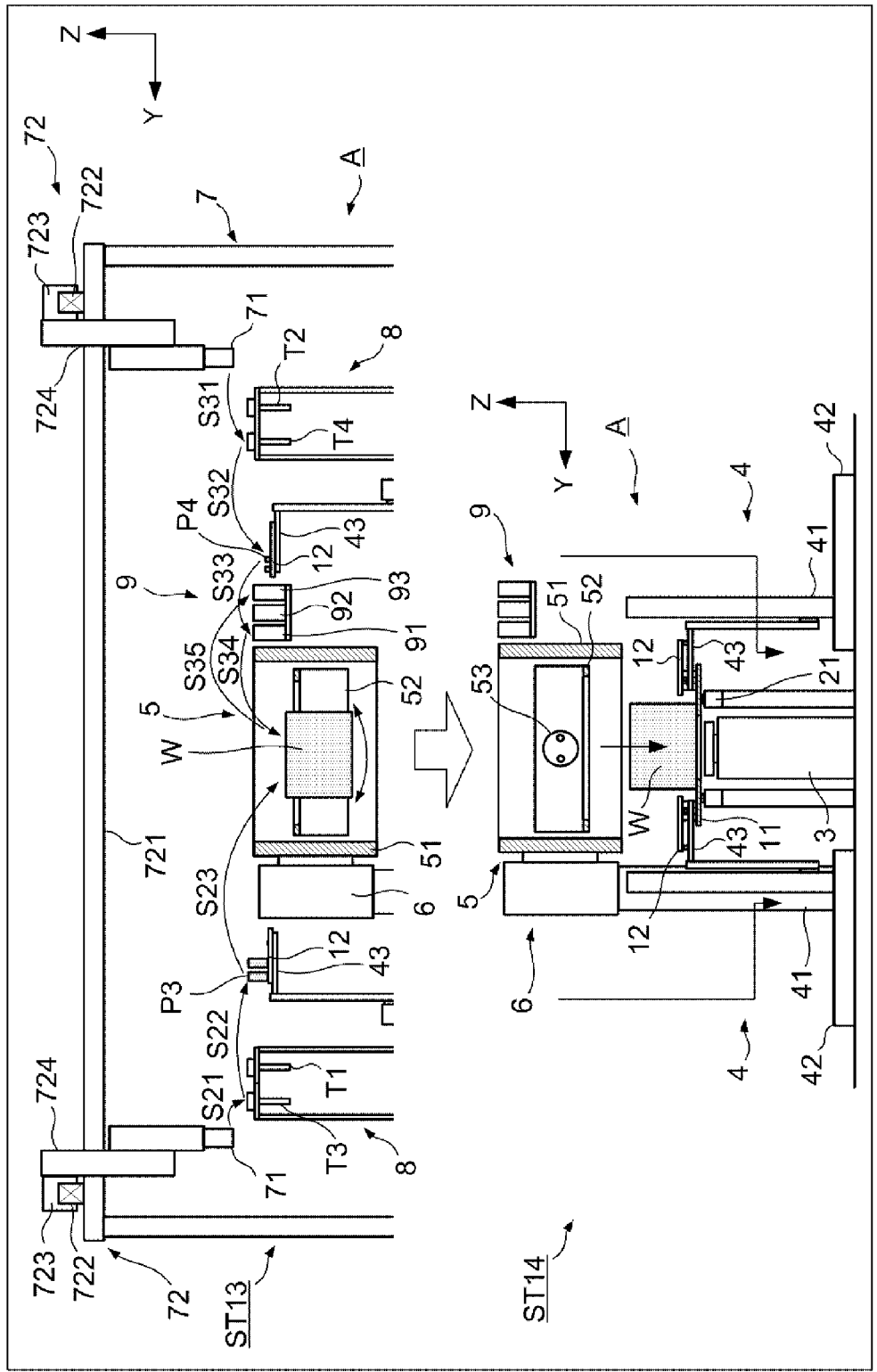
FIG. 14 is an explanatory view of the operation of the assembling apparatus shown in FIG. 1.

A state ST13 shown in FIG. 14 represents the assembling operation of the spring P3 and the retainer P4 (assembling step).

Assembling of the spring P3 is done by the head portion 71 and the moving device 72 on the left side of FIG. 14, and assembling of the retainer P4 is done by the head portion 71 and the moving device 72 on the right side of FIG. 14. Four springs P3 and four retainers P4 are alternately assembled.

The assembling procedure of the spring P3 will be described. First, the tool T3 corresponding to holding the spring P3 is attached to the head portion 71 (S21). Next, the spring P3 in the part preparation region R2 is held by the tool T3 and extracted (S22: extraction step). The held spring P3 is moved horizontally in the Y direction to the work operation region R1 and assembled to the cylinder head W (S23). The operations S22 and S23 are repeated from then on.

The assembling procedure of the retainer P4 will be described. First, the tool T4 corresponding to holding the retainer P4 is attached to the head portion 71 (S31). Next, the retainer P4 in the part preparation region R2 is held by the tool T4 and extracted (S32: extraction step). The held retainer P4 is moved horizontally in the Y direction to the detaching device 91, and the pair of cotter pieces C are detached in the tool T4 such that the stem of the valve P2 can be inserted and held by the tool T4 (S33: cotter piece detaching step). Details will be described later.

Subsequently, the retainer P4 is moved horizontally in the Y direction to the work operation region R1 and assembled to the cylinder head W (S34). Finally, the tool T4 is moved to the inspection device 93 to check whether the pair of cotter pieces C remain in the tool T4 (S35: inspection step). Details will be described later. The operations S32 to S35 are repeated from then on. Since the detaching device 91 and the inspection device 93 are located between the work operation region R1 and the part preparation region R2, the valve retainer assembling operation can efficiently be performed.

When assembling of all parts P1 to P4 to the cylinder head W is completed, the process shifts to an operation of unloading the cylinder head W. In this case, an operation reverse to the above-described preparation step is performed. More specifically, first, the driving portion 32 is driven to lift the lifting portion 31 and locate it at an ascent position. When the holding of the cylinder head W by the pair of holding portions 54 of the rotation mechanism 5 is canceled, the cylinder head W is placed on the lifting portion 31. Then, the driving portion 32 is driven to lower the lifting portion 31 to a descent position. In the process of lowering the lifting portion 31, the cylinder head W is transferred to the main pallet 11 (state ST14 shown in FIG. 14).

In parallel to transfer of the cylinder head W, the sub pallets 12 are attached to the main pallet 11. More specifically, first, the moving portions 41 lower the hand portions 43. The height of the hand portions 43 is set to be more than that of the main pallet 11. The moving portions 42 then move the moving portions 41 to the side of the main pallet 11. The sub pallets 12 are thus located above the side portions of the main pallet 11 (state ST14 shown in FIG. 14). When the moving portions 41 lower the hand portions 43, the distal ends of the pins 13 are inserted into the through holes 12a of the sub pallets 12, and the sub pallets 12 are attached to the main pallet 11. The cylinder head W is thus set in an unloadable state.

Figure 15:
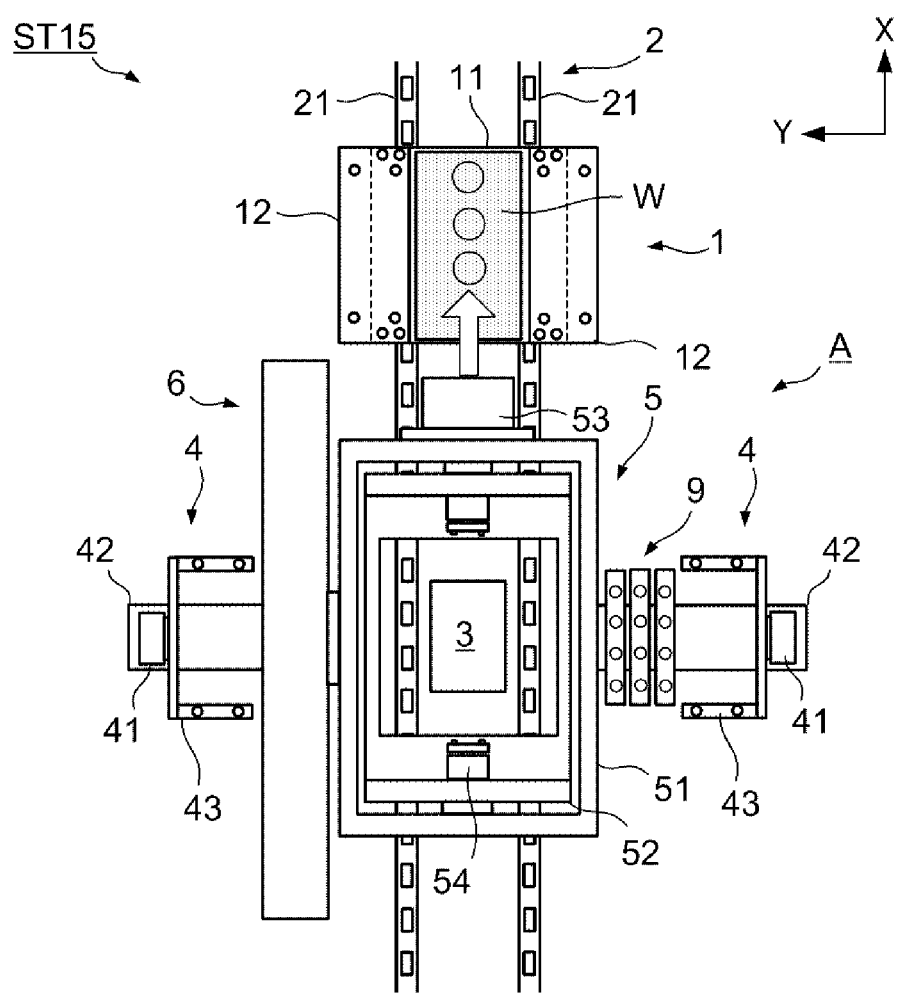
FIG. 15 is an explanatory view of the operation of the assembling apparatus shown in FIG. 1.

After that, the conveyance mechanism 2 is driven, thereby unloading the cylinder head W, as indicated by a state ST15 shown in FIG. 15.

Figure 16:
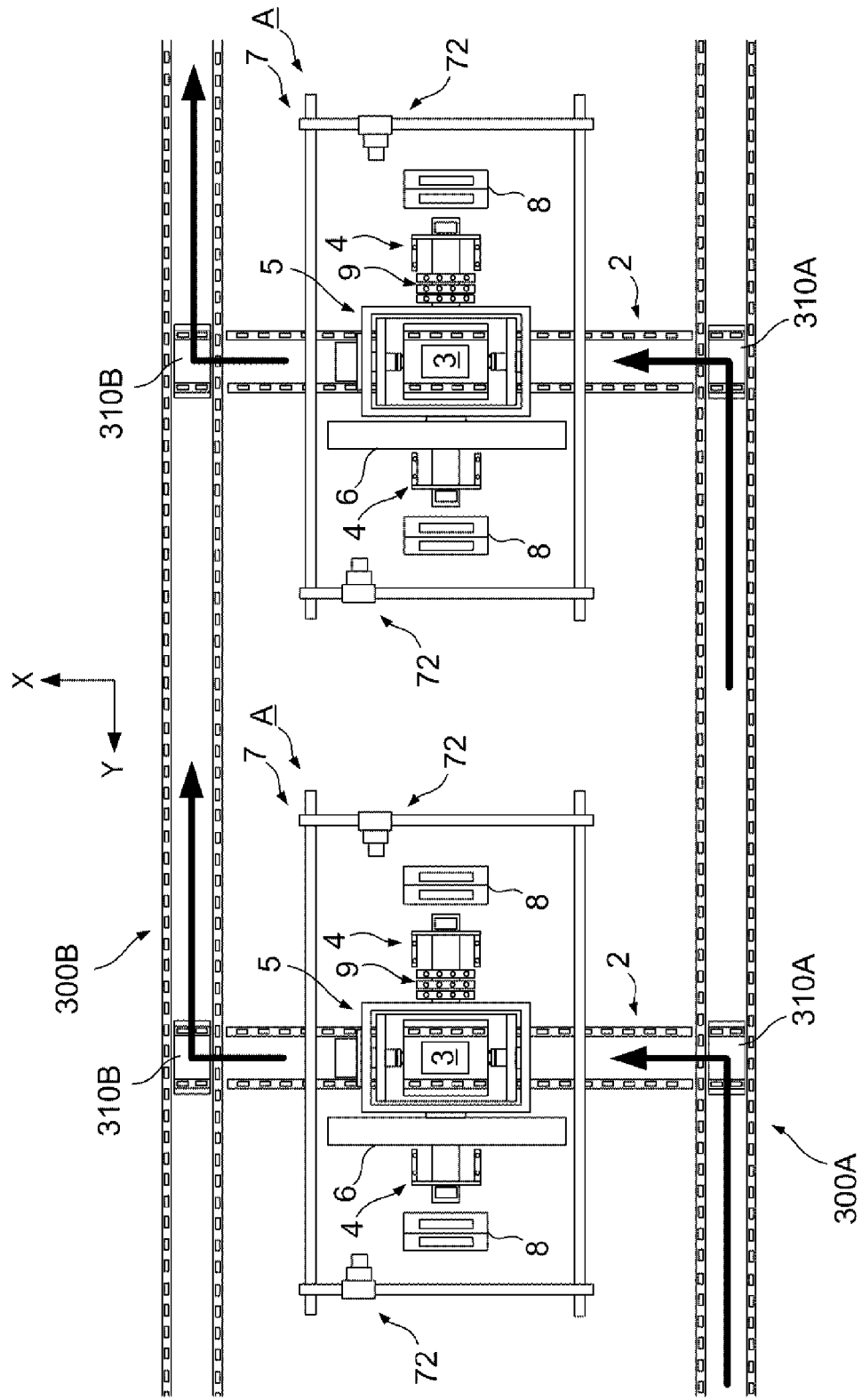
FIG. 16 is a view showing an example of application of the assembling apparatus shown in FIG. 1.

As described above, in this embodiment, it is possible to convey the work W so as to pass through the assembling apparatus A constituting a cell while implementing the function of simultaneously supplying the work W and the parts P1 to P4 and the rolling function and the pitching mechanism of the work W. For this reason, for example, a layout as shown in FIG. 16 can be employed. FIG. 16 shows an example in which a plurality of assembling apparatuses A are provided midway through main conveyance lines 300A and 300B. The main conveyance lines 300A and 300B form conveyors. In this embodiment, roller conveyors are formed. The conveyance mechanisms 2 of the assembling apparatuses A from parallel lines provided midway through the main conveyance lines 300A and 300B.

Lifting type transfer conveyors 310A and 310B are arranged at the branches between the main conveyance lines 300A and 300B and the conveyance mechanisms 2. The conveyance height of the conveyance mechanisms 2 is different from that of the main conveyance lines 300A and 300B. This allows the transfer conveyors 310A and 310B to transfer the pallet 1 from the main conveyance line 300A to the conveyance mechanism 2 and transfer the pallet 1 from the conveyance mechanism 2 to the main conveyance line 300B.

As already described above, in this embodiment, the work W can be conveyed so as to pass through the assembling apparatus A. Hence, the work W (pallet 1) can be conveyed in the order of main conveyance line 300A→conveyance mechanism 2→main conveyance line 300B, as indicated by the arrows in FIG. 16, and the work W can continuously be loaded to the assembling apparatus A.

<Assembling of Retainer>

Figure 17:
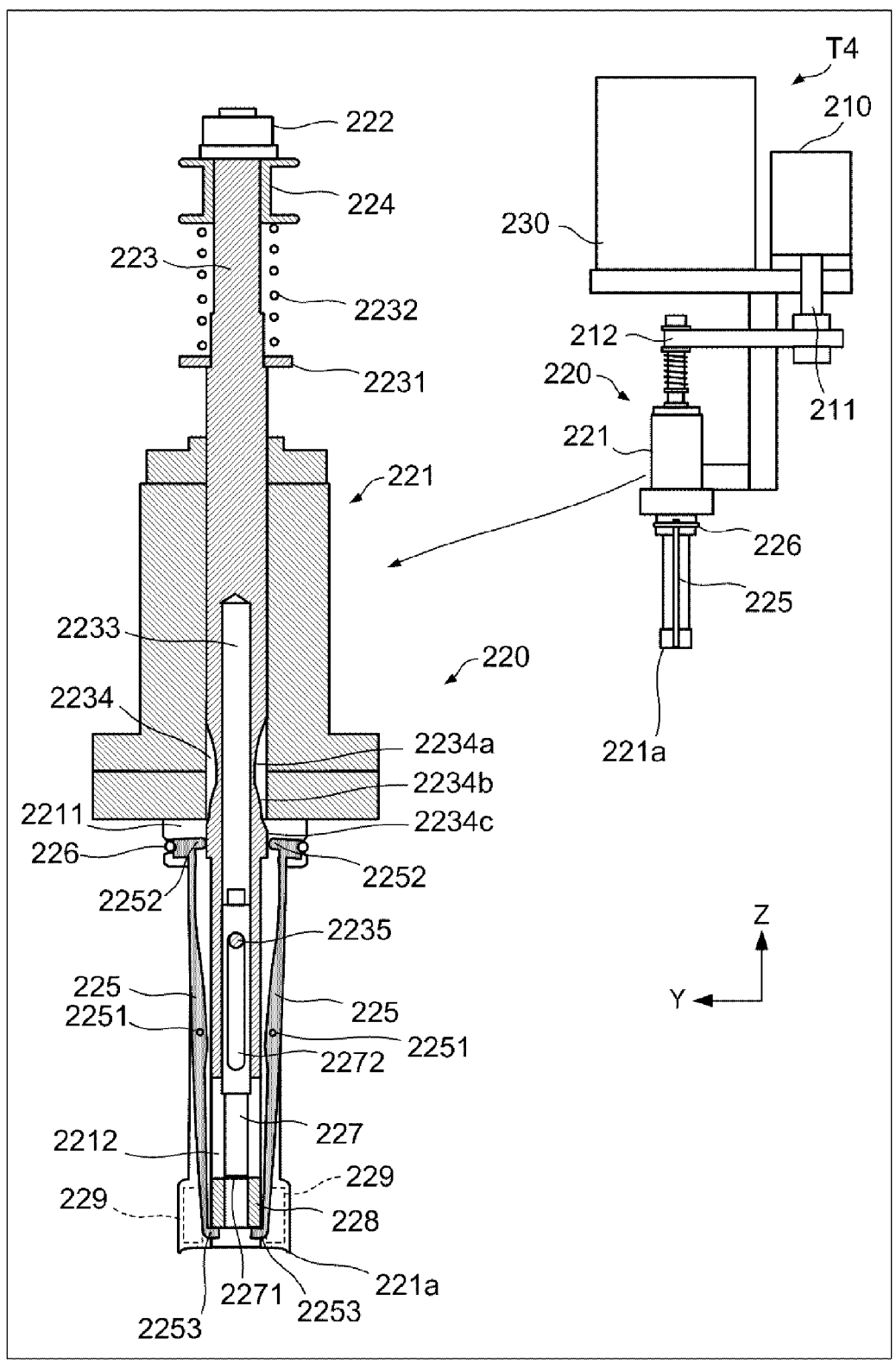
FIG. 17 is an explanatory view of an example of an operation tool.

An example of the arrangement of the tool T4 (retainer holding tool) used to assemble the retainer P4 will be described. FIG. 17 shows a schematic view of the tool T4 and a sectional view of a holding unit 220 provided in the tool T4 for each part.

The tool T4 includes a driving unit 210, the holding unit 220, and a support member 230 configured to support them. The support member 230 is a portion attached/detached to/from the head portion 71. As the head portion 71 moves, the entire tool T4 moves.

The driving unit 210 is an actuator configured to vertically move a plunger 211 and formed from, for example, an electric cylinder or a fluid cylinder. The plunger 211 is connected to a control shaft 223 of the holding unit 220 (to be described later) through an arm member 212. When the driving unit 210 moves the plunger 211, the control shaft 223 can be moved vertically.

The holding unit 220 includes a main body portion 221 that constitutes a housing. The main body portion 221 is formed from a plurality of parts and has a cylindrical shape as a whole in which the control shaft 223 is inserted. The main body portion 221 has, at its lower portion, slits 2211 which are formed in the outer surface and in which a pair of arm members 225 are arranged, and an inner space 2212 capable of storing the cotter pieces C or the like. The slits 2211 are arranged at opposing positions (arranged while being shifted by 180° in the circumferential direction).

A lower end face 221a of the main body portion 221 forms a butt surface against which the upper surface of the retainer P4 abuts. A magnet 229 is arranged in a portion immediately above the lower end face 221a (a portion other than the slits 2211). In this embodiment, the retainer P4 is held by the magnetic force of the magnet 229.

Each arm member 225 is pivotally supported by the main body portion 221 through a pin 2251 at its center. An abutment portion 2252 abutting against the outer surface of the control shaft 223 is formed at the upper end of each arm member 225. A grip portion 2253 is formed at the lower end of each arm member 225. An annular spring member 226 is provided on the abutment portions 2252. The spring member 226 always presses the abutment portions 2252 against the outer face of the control shaft 223.

The control shaft 223 has an insertion hole 2233 as a closed hole from its center to the lower portion, and includes a solid member on the upper portion. The control shaft 223 is provided through the main body portion 221, and can move in the Z direction while being guided by the main body portion 221.

A cylindrical bracket 224 is provided around the upper portion of the control shaft 223. The bracket 224 is movable along the axial direction of the control shaft 223 and is connected to the arm member 212. A stopper 222 configured to prevent the bracket 224 from being removed is fixed to the uppermost portion of the control shaft 223.

A receiving member 2231 is fixed to a position of the control shaft 223 spaced part from the bracket 224 by a predetermined distance. A coil spring 2232 is attached between the receiving member 2231 and the bracket 224. When the driving unit 210 operates to lower the arm member 212, the bracket 224 also lowers, and a force acts on the control shaft 223 through the coil spring 2232 to lower it. As a result, the control shaft 223 can be lowered.

When the driving unit 210 operates to lift the arm member 212, the bracket 224 also rises and interferes with the stopper 222, and a force acts on the control shaft 223 to lift it. As a result, the control shaft 223 can be lifted. As described above, in this embodiment, not only moving the entire tool T4 by the head portion 71 of the operation unit 7 but lifting/lowering the control shaft 223 alone is also possible. Note that in this embodiment, the coil spring 2232 is provided to absorb shock. However, an arrangement that fixes the arm member 212 and the control shaft 223 can also be employed.

An outer diameter changing portion 2234 that changes the outer diameter continuously in the axial direction is formed midway in the control shaft 223. The outer diameter changing portion 2234 includes a minimum diameter portion 2234a, an intermediate diameter portion 2234b, and a maximum diameter portion 2234c. The outer diameter changing portion 2234 controls the open/closed state of the arm members 225. In a state shown in FIG. 17, the abutment portions 2252 abut against the maximum diameter portion 2234c, and the arm members 225 are in a closed state in which the grip portions 2253 are closed. When the abutment portions 2252 abut against the minimum diameter portion 2234a, an open state is obtained in which the grip portions 2253 are opened. When the abutment portions 2252 abut against the intermediate diameter portion 2234b, an intermediate state is obtained in which the grip portions 2253 are opened a little.

A shaft body 227 is coaxially inserted into the insertion hole 2233 so as to be movable in the axial direction. The shaft body 227 has, at its upper portion, a long hole 2272 extending through in the radial direction. A shaft (pin) 2235 fixed to the control shaft 223 is inserted into the long hole 2272 to regulate the moving range of the shaft body 227 in the insertion hole 2233. The lower portion of the shaft body 227 is a solid shaft portion 2271 whose diameter is smaller than the minimum inner diameter of the cotter p4.

At the lower portion of the control shaft 223, a cylindrical member 228 is provided in the inner space 2212. The cylindrical member 228 is freely movable in the vertical direction within the range regulated by the shaft 2235 in the inner space 2212, and is provided to suppress the cotter p4 from above by its weight.

The assembling operation of the retainer P4 by the tool T4 will be described next with reference to FIGS. 18 to 23 and already explained FIG. 14.

Figure 18:
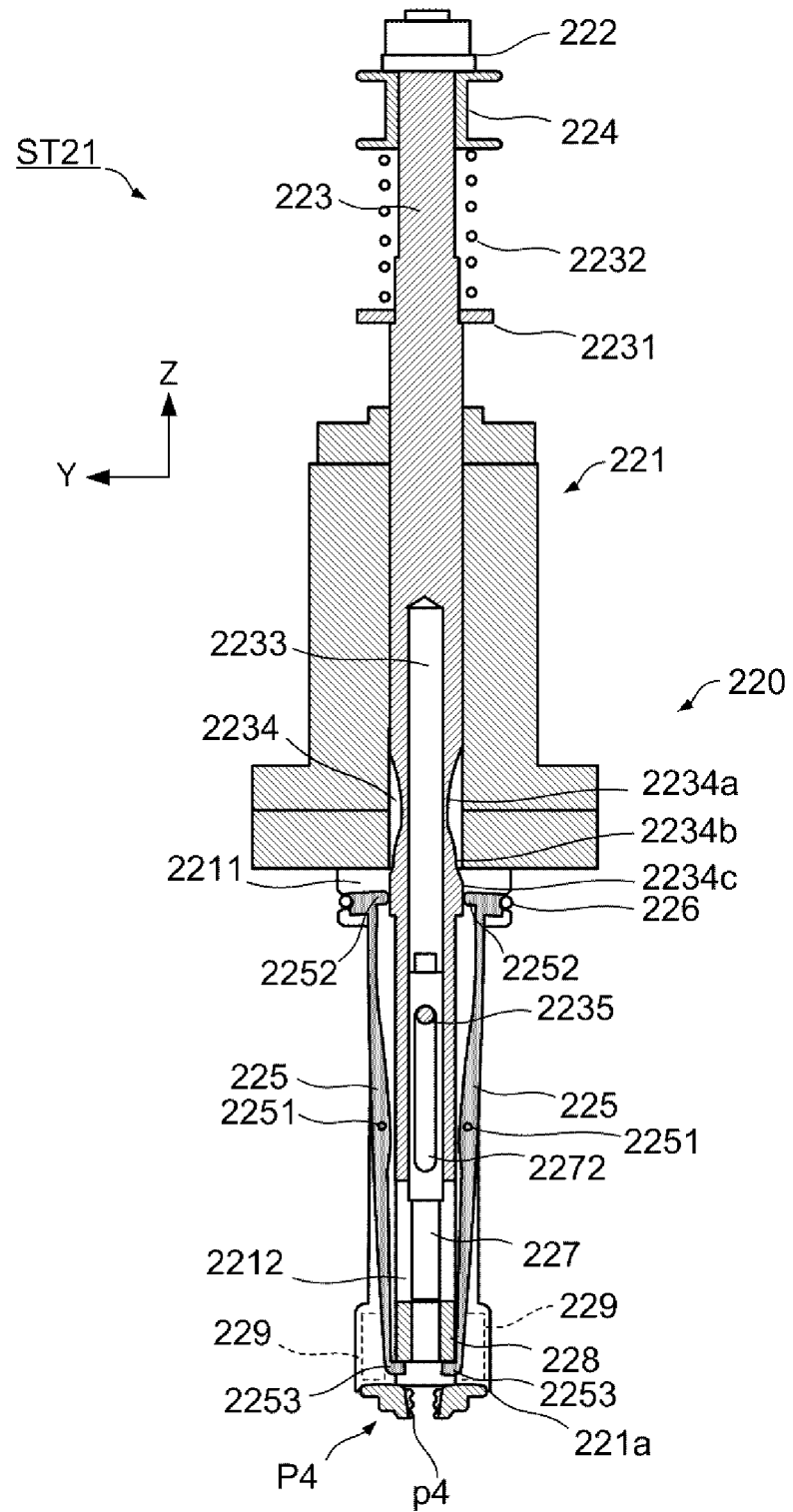
FIG. 18 is an explanatory view of the operation of an operation tool shown in FIG. 14.
Figure 19:
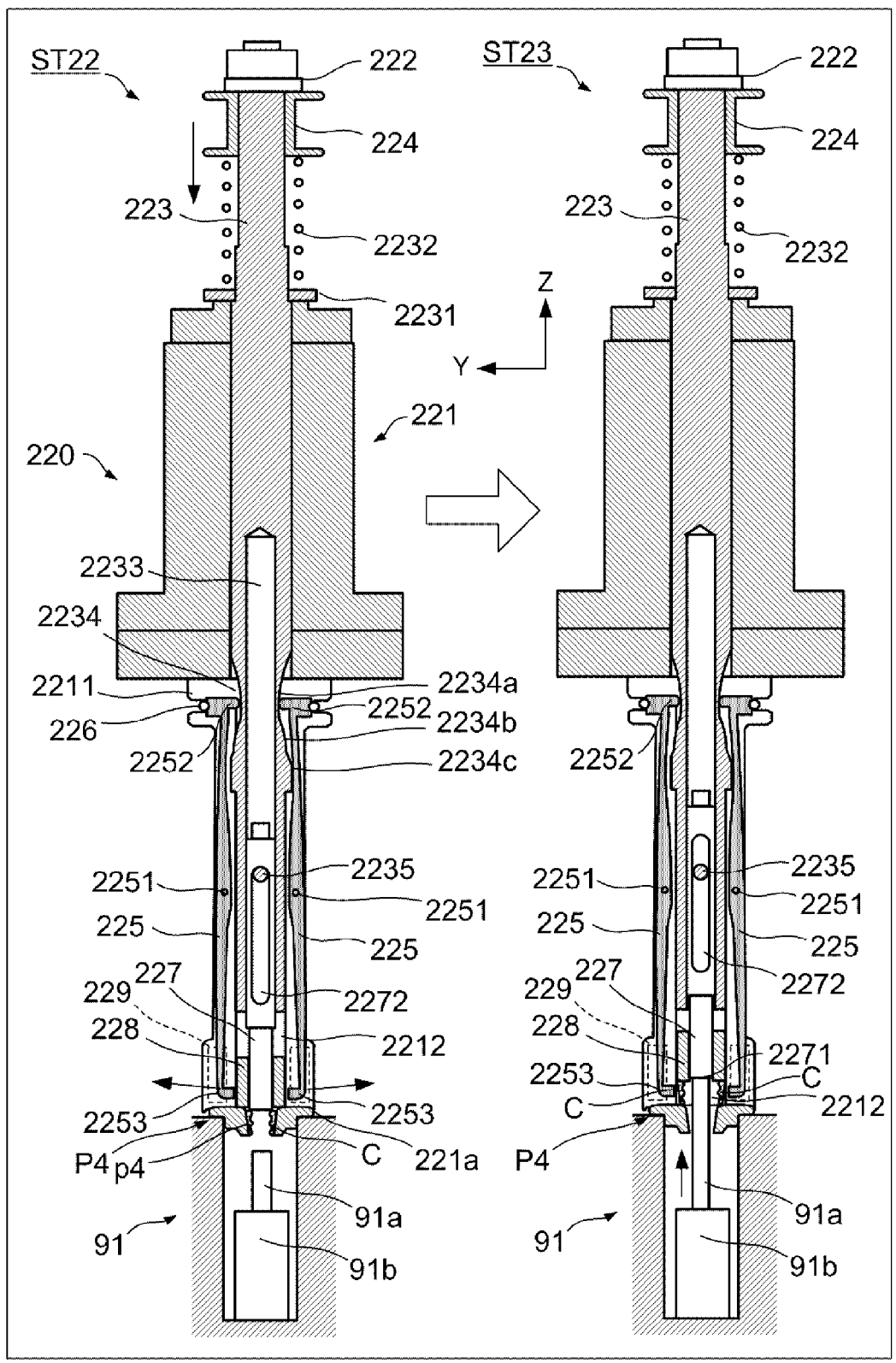
FIG. 19 is an explanatory view of the operations of the operation tool shown in FIG. 14 and a detaching device.
Figure 20:
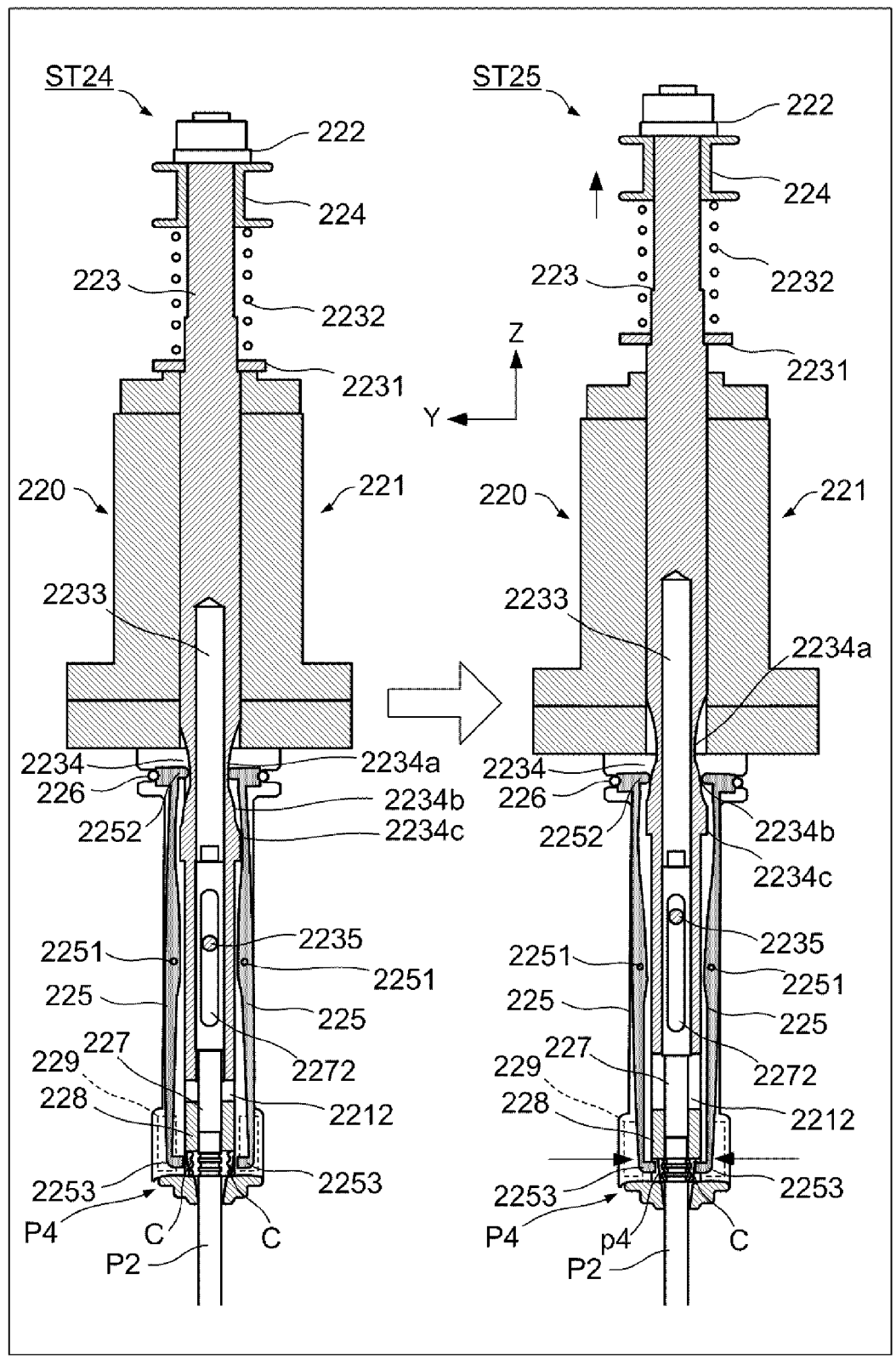
FIG. 20 is an explanatory view of the operation of the operation tool shown in FIG. 14.
Figure 21:
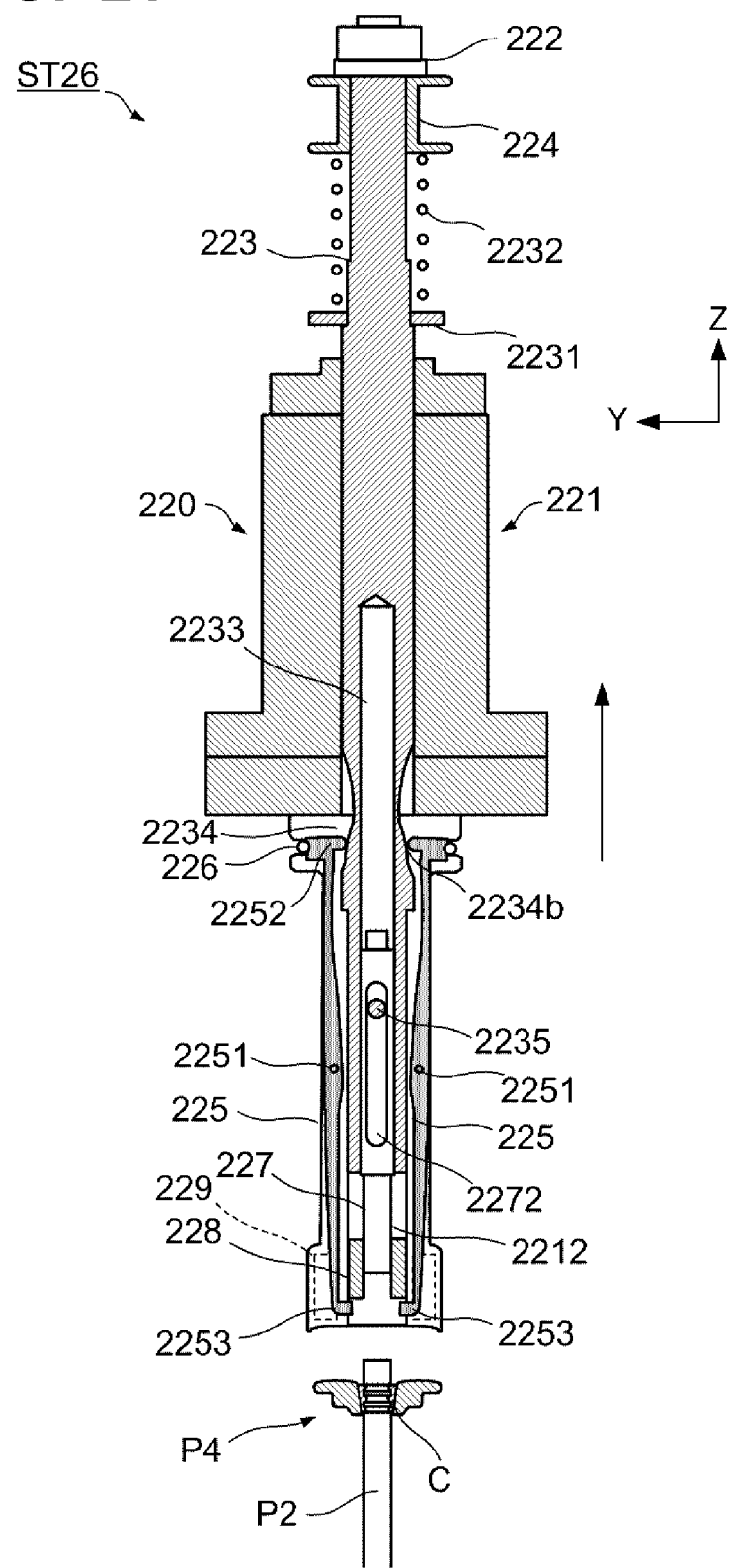
FIG. 21 is an explanatory view of the operation of the operation tool shown in FIG. 14.

The operation S32 described concerning the state ST13 shown in FIG. 14 will be explained first. In the operation S32, the retainer P4 is held by the tool T4 and extracted from the part preparation region R2. When the head portion 71 moves onto the part preparation region R2 and lowers, and the lower end face 221a of the main body portion 221 abuts against the upper surface of the retainer P4, the retainer P4 is held by the magnet 229. A state ST21 shown in FIG. 18 represents a state in which the retainer P4 is held by the holding unit 220. The pair of cotter pieces C are located in the retainer P4.

The operation S33 described concerning the state ST13 shown in FIG. 14 will be explained next. In the operation S33, the pair of cotter pieces C are detached in the tool T4 such that the stem of the valve P2 can be inserted and held by the tool T4. The head portion 71 moves onto the detaching device 91 shown in FIG. 8 and lowers, and the retainer P4 is set on the detaching device 91, as indicated by a state ST22 shown in FIG. 19.

The driving unit 210 is driven to lower the control shaft 223, and the abutment portions 2252 of the arm members 225 are made to abut against the minimum diameter portion 2234a. An open state in which the grip portions 2253 are opened is thus obtained, as indicated by a state ST22, and the cotter pieces C can be introduced to the inner space 2212.

Next, the actuator 91b of the detaching device 91 is driven to lift the push shaft 91a. The diameter of the push shaft 91a is larger than the inner diameter of the cotter p4 and smaller than the inner diameter of the retainer P4. Hence, as indicated by a state ST23 shown in FIG. 19, the cotter p4 is pushed up to the holding unit 220 through the retainer P4. The cotter p4 is pushed up to the inner space 2212 while being pressed by the cylindrical member 228 from above. The pair of cotter pieces C are detached to the left and right sides by the magnetic force of the magnet 229. The cotter pieces C are thus held in the holding unit 220.

The operation S34 described concerning the state ST13 shown in FIG. 14 will be explained next. In the operation S34, the retainer P4 is moved horizontally in the Y direction to the work operation region R1 and assembled to the cylinder head W. As described above, the retainer P4 is held at the lower end of the holding unit 220 by the magnetic force of the magnet 229, and the cotter pieces C are held in the holding unit 220 in a detached state. The head portion 71 moves onto the cylinder head W and lowers, and the upper end of the stem of the valve P2 enters from the lower end of the holding unit 220, as indicated by a state ST24 shown in FIG. 20. Note that FIG. 20 does not illustrate the spring P3.

The tool T4 is lowered up to a portion where the engaging portion of the upper end of the stem of the valve P2 is located between the cotter pieces C. In this case, the driving unit 210 is driven to lift only the control shaft 223 and make the abutment portions 2252 of the arm members 225 abut against the maximum diameter portion 2234c. The grip portions 2253 are thus set in a closed state and press the cotter pieces C to the stem side against the magnetic force of the magnet 229, and the cotter pieces C can engage with the engaging portion of the upper end of the stem.

In this state, the tool T4 cannot be removed from the valve P2. To do this, the driving unit 210 is driven to slightly lower only the drive shaft 223 and make the abutment portions 2252 of the arm members 225 abut against the intermediate diameter portion 2234b. The grip portions 2253 are thus set in an intermediate state in which they are opened a little, as indicated by a state ST25. When the grip portions 2253 are opened a little, the cotter pieces C may be moved in a detaching direction again by the magnetic force of the magnet 229. However, since the grip portions 2253 are not in an open state, the cotter pieces C and the engaging portion of the upper end of the stem are at least in a half-engaging state.

In this state, the head portion 71 is lifted to lift the entire tool T4. The retainer P4 starts rising as the holding unit 220 is lifted. However, the cotter pieces C do not follow. While the cotter pieces C enter the retainer P4, and the engaging state between the cotter pieces C and the engaging portion of the upper end of the stem is maintained, the tool T4 can be removed from the valve P2. As a result, as indicated by a state ST26 shown in FIG. 21, the retainer P4 is assembled to the stem of the valve P2. Note that FIG. 21 does not illustrate the spring P3.

The operation S35 described concerning the state ST13 shown in FIG. 14 will be explained next. In the operation S35, the tool T4 is moved to the inspection device 93 shown in FIG. 8 to check whether the pair of cotter pieces C remain in the tool T4 (in the holding unit 220). This is an operation of confirming whether the retainer P4 has correctly been assembled to the stem of the valve P2. If the assembling fails, the cotter pieces C remain in the holding unit 220, or the retainer P4 remains being held at the end of the holding unit 220 by the magnetic force. To prevent this, inspection is conducted.

Figure 22:
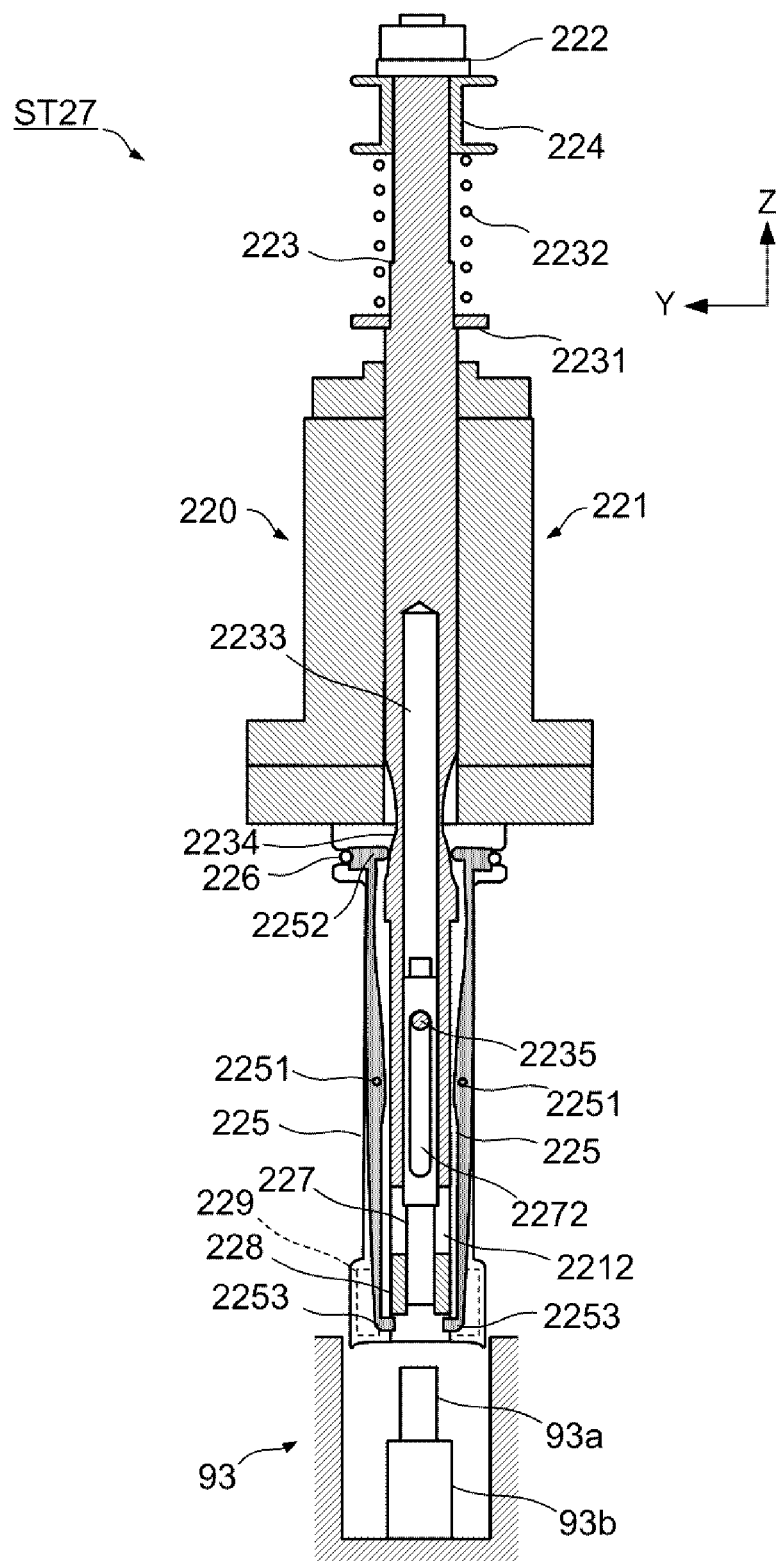
FIG. 22 is an explanatory view of the operation of an inspection device.

The head portion 71 moves onto the inspection device 93, and the holding unit 220 lowers to the inspection device 93, as indicated by a state ST27 shown in FIG. 22. When the head portion 71 lowers by a predetermined amount, the holding unit 220 enters the inspection device 93 by a predetermined amount.

Figure 23:
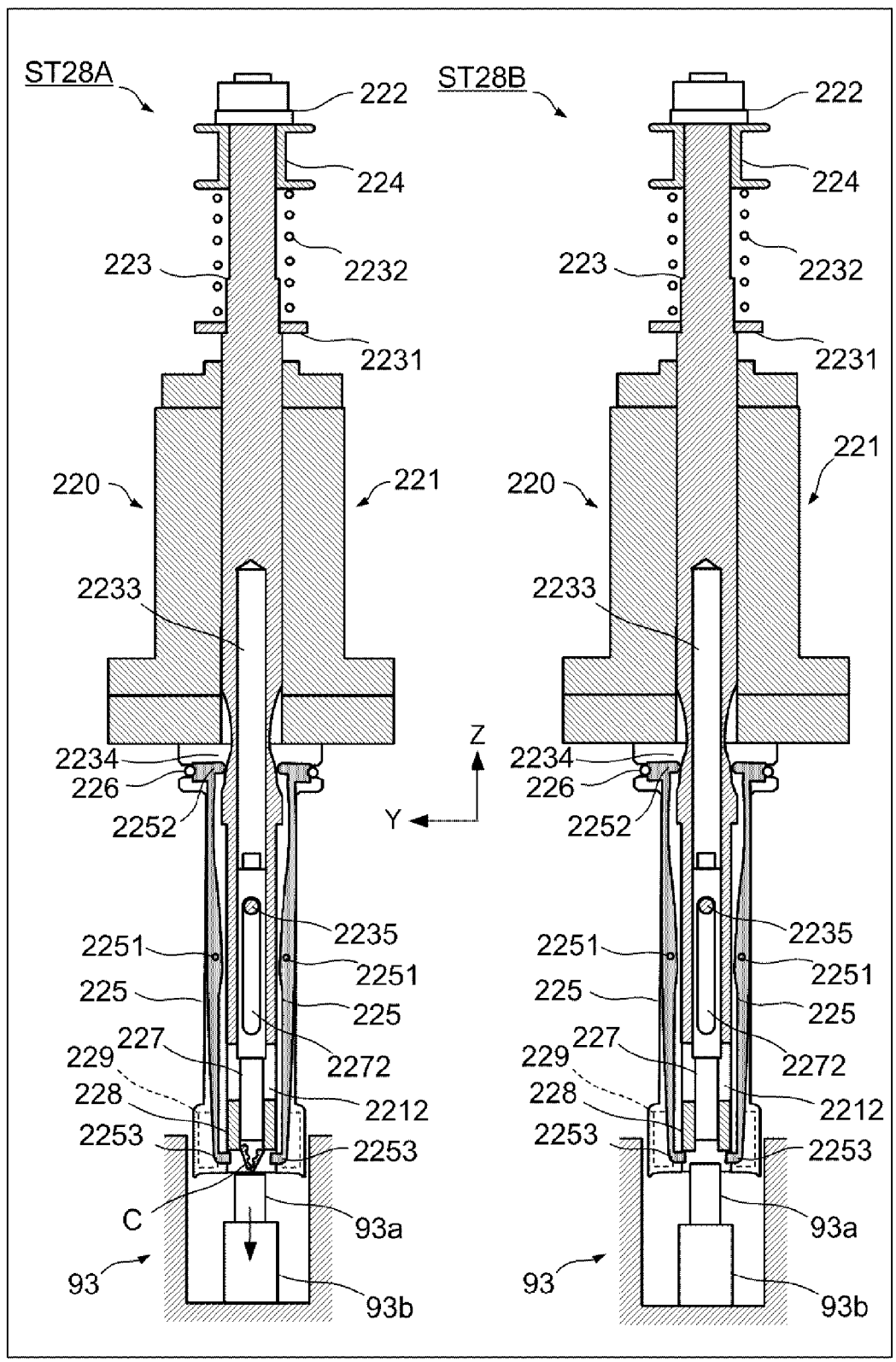
FIG. 23 is an explanatory view of the operation of the inspection device.

As indicated by a state ST28A shown in FIG. 23, when the cotter pieces C remain in the holding unit 220, the cotter pieces C interfere with the button portion 93a and push it. The sensing portion 93b senses the push on the button portion 93a, thereby sensing that the cotter pieces C remain. It is therefore determined that assembling of the retainer P4 has failed.

As indicated by a state ST28B shown in FIG. 23, when the cotter pieces C do not remain in the holding unit 220, the button portion 93a enters the inner space 2212 but is not pushed. The sensing portion 93b senses no push on the button portion 93a, thereby sensing that the cotter pieces C do not remain. It is therefore determined that assembling of the retainer P4 has succeeded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-070430, filed Mar. 28, 2013, which is hereby incorporated by reference herein in its entirety.

What is claimed is:

1. An assembling apparatus for assembling a valve retainer including a pair of cotter pieces to a cylinder head, comprising:
a main pallet on which the cylinder head is placed;
a sub pallet which is detachably attached to said main pallet and on which at least the valve retainer is placed;
a conveyance mechanism configured to horizontally convey said main pallet;
a lifting mechanism provided under a predetermined position of a conveyance track of said main pallet by said conveyance mechanism and configured to disconnect, from said main pallet, the cylinder head placed on said main pallet and lift/lower said cylinder head;
a moving mechanism provided on one side of said lifting mechanism and configured to detach, from said main pallet, said sub pallet attached to said main pallet and lift/lower said sub pallet;
a rotation mechanism configured to hold the cylinder head lifted to a work operation region by said lifting mechanism and roll the cylinder head about a horizontal axis;
an operation unit including a retainer holding tool configured to hold the valve retainer, and configured to extract, by said retainer holding tool, the valve retainer from said sub pallet lifted to a part preparation region by said moving mechanism and assemble the valve retainer to a valve stem of a valve incorporated in the cylinder head; and
a detaching device arranged between the work operation region and the part preparation region and configured to detach the pair of cotter pieces of the valve retainer in said retainer holding tool such that the valve stem can be inserted and cause said retainer holding tool to hold the pair of cotter pieces.

2. The apparatus according to claim 1, wherein the part preparation region is spaced part from the work operation region in a direction perpendicular to a conveyance direction of said conveyance mechanism,
said moving mechanism can move said sub pallet in the perpendicular direction and a vertical direction with respect to said main pallet,
said operation unit comprises:
a head portion to which a plurality of types of assembling tools including said retainer holding tool are interchangeably attached; and
a moving device configured to move said head portion in the conveyance direction, the perpendicular direction, and the vertical direction,
the assembling apparatus further comprises a tool placement portion on which the plurality of types of assembling tools are placed, and
the work operation region, the part preparation region, and said tool placement portion are arranged in an order named in the perpendicular direction.

3. The apparatus according to claim 2, wherein said moving mechanism comprises:
a first moving portion configured to move said sub pallet in the vertical direction; and
a second moving portion configured to move said first moving portion in the perpendicular direction.

4. The apparatus according to claim 1, further comprising an inspection device arranged between the work operation region and the part preparation region and configured to inspect whether the pair of cotter pieces remain in said retainer holding tool.

5. The apparatus according to claim 1, wherein said conveyance mechanism comprises a conveyor,
said conveyor constituting one of a plurality of parallel lines provided midway through a main conveyance line.

* * * * *